(12) United States Patent
Chow et al.

(10) Patent No.: US 10,846,716 B1
(45) Date of Patent: Nov. 24, 2020

(54) SYSTEM AND METHOD FOR FACILITATING TRAINING OF A PREDICTION MODEL TO ESTIMATE A USER VEHICLE DAMAGE TOLERANCE

(71) Applicant: Capital One Services, LLC, McLean, VA (US)

(72) Inventors: Chih-Hsiang Chow, McLean, VA (US); Elizabeth Furlan, McLean, VA (US); Steven Dang, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/728,728

(22) Filed: Dec. 27, 2019

(51) Int. Cl.
| | |
|---|---|
| *G06Q 30/02* | (2012.01) |
| *G06N 3/08* | (2006.01) |
| *G06N 3/04* | (2006.01) |
| *G06K 9/62* | (2006.01) |
| *G06T 7/00* | (2017.01) |

(52) U.S. Cl.
CPC ....... *G06Q 30/0202* (2013.01); *G06K 9/6256* (2013.01); *G06N 3/04* (2013.01); *G06N 3/08* (2013.01); *G06T 7/0002* (2013.01); *G06T 2207/20081* (2013.01); *G06T 2207/20084* (2013.01); *G06T 2207/30252* (2013.01); *G06T 2207/30268* (2013.01)

(58) Field of Classification Search
CPC ........ G06Q 30/0202; G06N 3/04; G06N 3/08; G06K 9/6256; G06T 7/002; G06T 2207/20081; G06T 2207/20084; G06T 2207/30252; G06T 2207/30268
USPC .......................................................... 706/16
See application file for complete search history.

(56) References Cited

U.S. PATENT DOCUMENTS

| | | | | |
|---|---|---|---|---|
| 2016/0364783 | A1* | 12/2016 | Ramanuja | G06Q 30/0631 |
| 2017/0270580 | A1* | 9/2017 | Esposito | G06Q 30/0613 |
| 2018/0260793 | A1* | 9/2018 | Li | G06Q 10/20 |
| 2020/0065956 | A1* | 2/2020 | Shen | G06N 3/08 |

* cited by examiner

*Primary Examiner* — Dave Misir
(74) *Attorney, Agent, or Firm* — Pillsbury Winthrop Shaw Pittman LLP

(57) ABSTRACT

Some embodiments relate to techniques for facilitating training of a prediction model for estimating a threshold score for a user. In some embodiments, a first image of at least a first portion of a first vehicle may be provided to a client device, where the first image may be associated with a first damage score. From the client device, a user-provided score for the first image may be received. Based on the user-provided score, a second image of at least a second portion of a second vehicle may be provided to the client device, where the second image may be associated with a second damage score. Training data may be generated based on the first damage score and the second damage score, and the training data may be provided to a prediction model to train the prediction model to estimate a threshold score for a user.

20 Claims, 11 Drawing Sheets

SYSTEM AND METHOD FOR FACILITATING TRAINING OF A PREDICTION MODEL TO ESTIMATE A USER VEHICLE DAMAGE TOLERANCE

FIELD

Certain embodiments disclosed herein relate to facilitating training of a prediction model to estimate a vehicle damage tolerance of a user, including, for example, generating training data to train a prediction model to estimate a threshold score for one or more users that indicates a user's tolerance of vehicle damage.

BACKGROUND

A user seeking to purchase a vehicle, such as a pre-owned vehicle, may view images of various pre-owned vehicles available for purchase. For example, the user may view the images by accessing a vehicle retailer's website. Some pre-owned vehicles may include damage, such as a scratch, dent, etc., to a portion of the vehicle. If the images of the pre-owned vehicles depict damage in excess of what a particular user deems as acceptable (e.g., the user would not consider purchasing a vehicle having such an amount of damage), then the user may leave the vehicle retailer's website for another vehicle retailer's website, thus preventing the vehicle retailer from a potential sale and/or revenue from advertisements rendered to the user, etc. This is challenging for vehicle retailers as it is extremely difficult to gauge what amount of damage to a vehicle a particular user will deem acceptable or not acceptable.

SUMMARY

In some embodiments, a first image of at least a first portion of a first vehicle may be provided to a client device. The first image may be associated with a first damage score. A first user-provided score for the first image may be received from the client device and, based on the first user-provided score, a second image of at least a second portion of a second vehicle may be provided to the client device. The second image may be associated with a second damage score. Training data may be generated based on the first damage score and the second damage score, and the training data may be provided to a prediction model to train the prediction model to estimate a threshold score for a user.

In some embodiments, the first damage score and the second damage score may be computed using a different prediction model. For example, the different prediction model may be a machine learning model, and additional training data for the machine learning model may include images depicting portions of vehicles having damage and images depicting portions of vehicles not having damage. Damage scores for each of the images depicting portions of vehicles having damage may be obtained from the machine learning model, which may then be used when training a prediction model to estimate a threshold score for a user.

In some embodiments, the prediction model may be a neural network, which may be provided with reference feedback information to update one or more configurations of the neural network. For example, the reference feedback information may include user-provided scores.

Various other aspects, features, and advantages of the invention will be apparent through the detailed description of the invention and the drawings attached hereto. It is also to be understood that both the foregoing general description and the following detailed description are examples and not restrictive of the scope of the invention.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
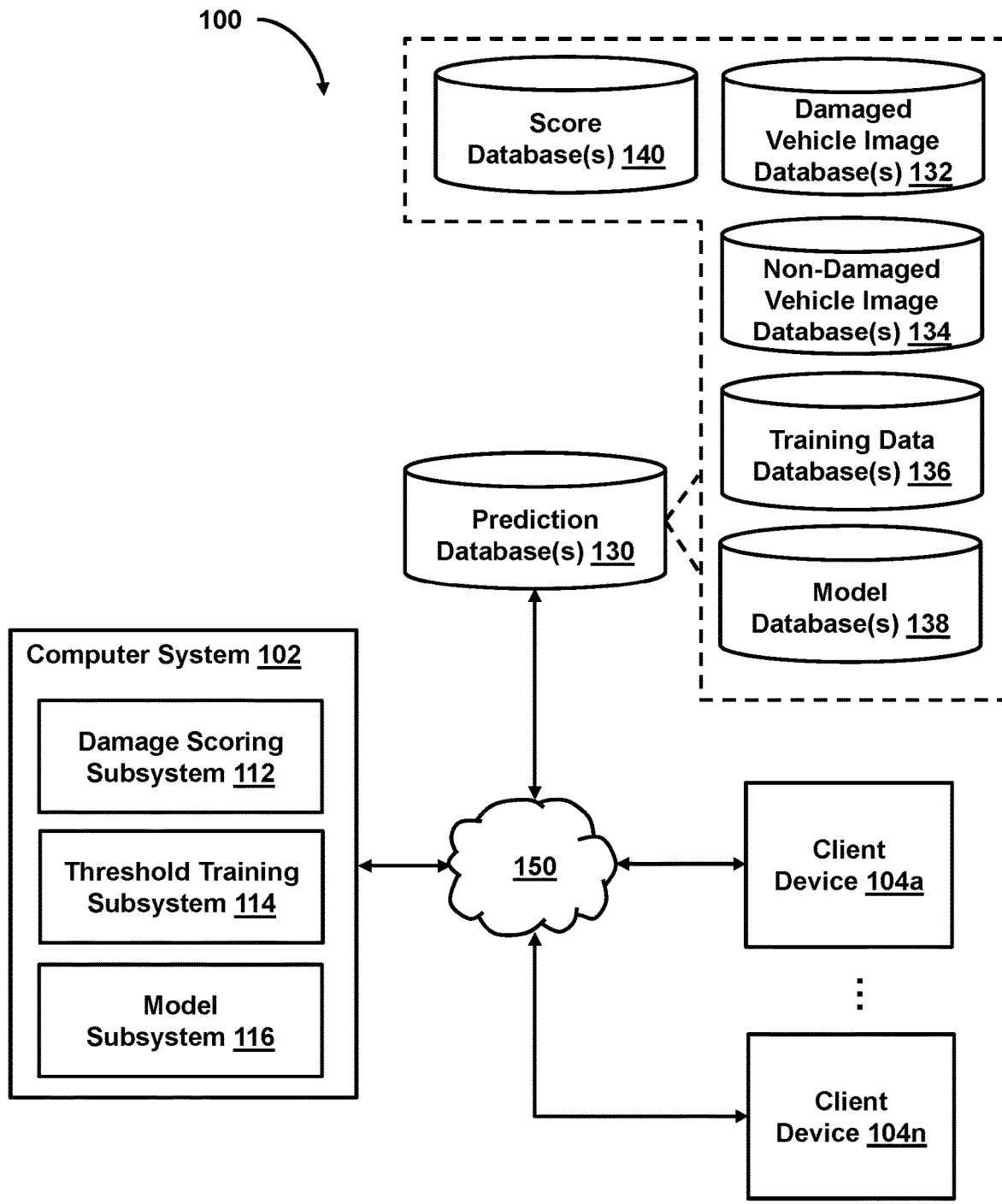
FIG. 1 show a system for facilitating training of a prediction model training to estimate a vehicle damage tolerance of a user, in accordance with one or more embodiments.

FIG. 1 shows a system 100 for facilitating training of a prediction model to estimate a vehicle damage tolerance of a user, in accordance with one or more embodiments. As shown in FIG. 1, system 100 may include computer system 102, client device 104 (or client devices 104a-104n), or other components. Computer system 102 may include damage scoring subsystem 112, threshold training subsystem 114, model subsystem 116, and/or other components. System 100 may also include prediction database(s) 130, which may include damaged vehicle image database(s) 132, non-damaged vehicle image database(s) 134, training data database(s) 136, model database(s) 138, and score database(s) 140. Each of damaged vehicle image database(s) 132, non-damaged vehicle image database(s) 134, training data database(s) 136, model database(s) 138, and score database(s) 140 may include one or more databases, which may be located at a single facility or may be distributed amongst a number of server sites. As described herein, each of damaged vehicle image database(s) 132, non-damaged vehicle image database(s) 134, training data database(s) 136, model database(s) 138, and score database(s) 140 may be referred to as damaged vehicle image database 132, non-damaged vehicle image database 134, training data database 136, model database 138, and score database 140. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 may facilitate generation of training data to be used to train a prediction model, where the prediction model, upon being trained, may estimate a threshold score indicative of a user's tolerance for damage to a vehicle. The user's tolerance for damage to a vehicle may refer to an amount of damage that a vehicle may have such that the user would still consider purchasing the vehicle. Vehicles that have more damage than a user's tolerance would indicate that the user would likely not purchase that vehicle.

When attempting to purchase a vehicle, a user may access one or more vehicle retailer websites. At a vehicle retailer website, the user may view images of vehicles that may be purchased. In some embodiments, the images may include images of a vehicle's interior as well as a vehicle's exterior. The images may be captured at various angles and/or lighting conditions, and may provide context to the user so as to aid in the user's purchasing decision. In some embodiments, the images may include images of pre-owned vehicles, or more generally, not-new vehicles. The term "pre-owned vehicle" and "not-new vehicle" may be used herein interchangeably. As described herein, a pre-owned or not-new vehicle may refer to any vehicle that has previously been owned by another entity other than a vehicle retailer from which the vehicle is purchasable. Furthermore, in some embodiments, a pre-owned vehicle may refer to any vehicle having less than a threshold amount of usage, which may relate to an amount of distance traveled by the pre-owned vehicle, hours spent using the pre-owned vehicle, days spent since the vehicle was received by the vehicle retailer (e.g., from the vehicle's manufacturer), etc.

In some embodiments, a portion of a pre-owned vehicle may include damage. The damage may be external damage (e.g., damage to the vehicle's exterior), and/or the damage may be internal damage (e.g., damage to the vehicle's interior). For instance, external damage may include minor damage, such as a scratch or small dent, and/or major damage, such as broken windows or crushed front. Internal damage may also include minor damage, such as small tears in the vehicle's interior fabric or faded interior materials, to major damage, such as stained fabric or ripped upholstery. Different individuals may deem different damage as being acceptable such that an individual will still consider purchasing a given vehicle having a particular amount of damage. Similarly, different individuals may deem different damage as being unacceptable such that the individual will not consider purchasing the given vehicle having the particular amount of damage. Generally, the damage to the portion of the pre-owned vehicle may refer to damage that is visible to a user, as opposed to damage not visible to the user. For example, an engine of the vehicle that is damaged may not be visible to a user (e.g., within an image of the vehicle).

A user may be provided with images of vehicles available for purchase. The vehicles may be viewed on the user's client device, such as by accessing a vehicle retailer website, an application running on the client device, via an email or messaging application, and the like. In some embodiments, the images may include portions of a given vehicle having damage. If the images include vehicles with more damage than a particular user deems as acceptable (e.g., the user would not consider purchasing a vehicle having such an amount of damage), then the user may leave the vehicle retailer's website for another vehicle retailer's website, thus preventing the vehicle retailer from a potential sale and/or revenue from advertisements rendered to the user, etc. However, if the images include portions of a vehicle having damage that is acceptable to the user, such that the user would consider purchasing those vehicles having such damage, then the vehicle retailer may potentially be rewarded with a sale of a vehicle and/or may receive compensation for advertisements that are able to be rendered to the user while viewing the vehicle.

In some embodiments, a prediction model may be trained to estimate a threshold score for one or more users indicative of a user tolerance of vehicle damage. For example, the prediction model may, after being trained, output a score indicating an amount of damage to a vehicle a user would deem acceptable to purchase, and/or an amount of damage to a vehicle a user would deem unacceptable. In some embodiments, the prediction model may be trained using training data generated based on feedback from a user with respect to a series of images of vehicles, each image being of a portion of a vehicle having an amount of damage.

In some embodiments, an image of a portion of a vehicle having an amount of damage may be provided from a computer system to a client device associated with a user. For example, the image may be displayed within a user interface rendered on the client device. In some embodiments, each image provided to the client device may be associated with a precomputed damage score indicating a predicted likelihood that an individual would purchase a vehicle having a same or similar amount of damage as the vehicle depicted within the image. The precomputed damage score, for example, may be a numerical value between 0 and 100. For example, a score of 0 may indicate that an individual is not expected to purchase a vehicle having a same or similar amount of damage as that of a vehicle depicted in an image having the damage score of 0, and a score of 100 may indicate that an individual is expected to purchase a vehicle having a same or similar amount of damage as that of a vehicle depicted in an image having the damage score of 100. As another example, the precomputed damage score may be a numerical value in a range of 0-1, 0-10, 1-100, etc. As still yet another example, the precomputed damage score may be one of a finite set of values, such as a 1, 2, or 3, where a 1 indicates a low probability (e.g., less than 33% chance) that the individual would purchase a vehicle having the amount of damage, a 2 indicates a medium probability (e.g., 33% or greater but less than 67% chance) that the individual would purchase a vehicle having the amount of damage, and a 3 indicates a high probability (e.g., 67% or greater chance) that the individual would purchase a vehicle having the amount of damage.

In some embodiments, after viewing the image of the vehicle, the user may be requested to provide a user-provided score for the image indicating whether the user would purchase a vehicle having the amount of damage that the vehicle in the provided image has. The user-provided score may be a numerical value (e.g., between 0-100), or may be one of a finite set of values (e.g., 1, 2, or 3), similar to the precomputed damage score described above. In some embodiments, the user-provided scores may be binary values (e.g., YES or NO) indicating that a user would or would not purchase a vehicle having a same or similar amount of damage as that of a vehicle depicted in the provided image. The user-provided score may be received by the computer system from the client device. In some embodiments, a subsequent image of a portion of another vehicle having an amount of damage may be selected based on the user-provided score. For example, the subsequent image may be selected because the precomputed damage score associated with the subsequent image is similar to the user-provided score for the current image. This may assist in gauging the difference between the user's perception of how different damage affects the purchase likelihood of the vehicle as compared with the precomputed likelihood indicated by the precomputed damage score. In response to viewing the subsequent image, the user may input a user-provided score for the vehicle depicted in the subsequent image. In some embodiments, additional images of vehicles may be provided to the user via the client device, and additional user-provided scores for those images may be received. Each subsequent image may be selected based on the user-provided score indicated by the user for the previously provided image.

In some embodiments, training data may be generated based on the precomputed damage scores of each image provided to the client device for which a user-provided score is received. The training data may include the precomputed damage scores for each of the images. In some embodiments, the training data may be provided to a prediction model, and the prediction model may be trained or configured based on such training data. For instance, the prediction model may be trained or configured to estimate a threshold score for one or more users indicating a user tolerance of vehicle damage. The threshold score may be referred to herein interchangeably as a threshold damage score. The user tolerance may refer to an amount of damage to a vehicle that an individual may consider acceptable such that the individual is not inhibited from purchasing the vehicle based on the amount of damage.

In some embodiments, the prediction model may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 2:
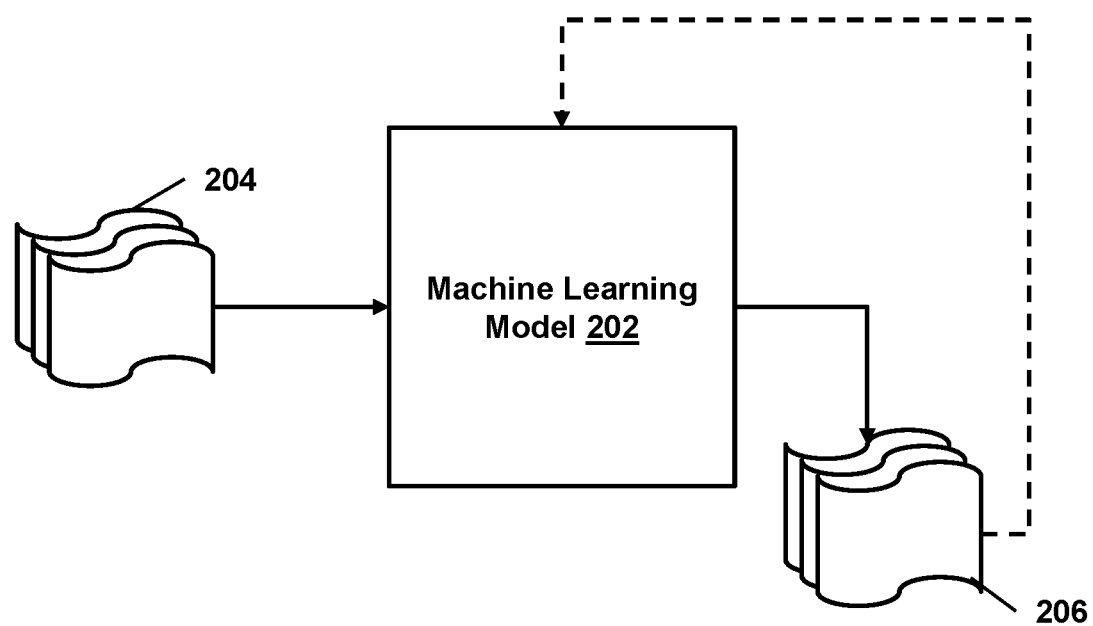
FIG. 2 shows a prediction model trained using training data, in accordance with one or more embodiments.

As an example, with respect to FIG. 2, machine learning model 202 may take inputs 204 and provide outputs 206. In some embodiments, outputs 206 may be fed back to machine learning model 202 as input to train machine learning model 202 (e.g., alone or in conjunction with user indications of the accuracy of outputs 206, labels associated with the inputs, or with other reference feedback information). In some embodiments, machine learning model 202 may update its configurations (e.g., weights, biases, or other parameters) based on its assessment of its prediction (e.g., outputs 206) and reference feedback information (e.g., user indication of accuracy, reference labels, or other information). In some embodiments, where machine learning model 202 is a neural network, connection weights may be adjusted to reconcile differences between the neural network's prediction and the reference feedback. Some embodiments include one or more neurons (or nodes) of the neural network requiring that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

A vehicle, as described herein, may refer to any transportation means. Some example transportation means may include, but are not limited to, automobiles (e.g., cars, trucks, buses, etc.), aircrafts (e.g., planes, helicopters, etc.), watercrafts (e.g., boats, kayaks, canoes, jet skis, etc.), motorcycles, bicycles, unicycles, tricycles, skateboards, roller skates, roller blades, scooters, and the like. Furthermore, while the foregoing descriptions refer to vehicles and estimating a threshold score for a user with respect to an amount of damage to a portion of a vehicle, the foregoing techniques and concepts may be applied to any type of object. For example, training data may be generated for training a prediction model to estimate a threshold score indicating a user's tolerance to damage to a musical instrument, an electronic device (e.g., a cell phone, television, gaming console, etc.), a household appliance (e.g., a dishwasher, refrigerator, barbeque, etc.), wearable items (e.g., clothing, jewelry, footwear, etc.), domiciles (e.g., houses, apartments, tents, etc.), texts (e.g., books, graphic novels, etc.), and the like.

In some embodiments, a precomputed damage score associated with an image depicting a portion of a vehicle having an amount of damage may be generated. The precomputed damage score for an image may be used to select a subsequent image of a portion of a vehicle having an amount of damage, and the subsequent image may be provided to a client device to obtain a user-provided score of that image, as mentioned above. In some embodiments, a plurality of images of vehicles may be obtained. The plurality of vehicles may include images of various portions of various vehicles, where each portion of a vehicle depicted in an image may include damage. For example, an image may depict a front bumper of a first automobile having a dent. As another example, an image may depict a backseat of a second automobile having a stain.

In some embodiments, the images of the vehicles including portions having damage may be obtained from one or more client devices associated with a vehicle retailer. For instance, a salesperson employed by the vehicle retailer may capture images of a vehicle using a client device (e.g., client device 104), and may store those images in a database (e.g., damaged vehicle image database 132). In some embodiments, multiple images of a same vehicle may be obtained. The multiple images may include different portions of the vehicle depicted therein, where some portions may include damage and some portions may not include damage. Furthermore, some images may be of a same portion of a same vehicle but captured at different angles, with different lighting conditions (e.g., dark, bright, flash, etc.), and/or with different image capturing devices. The plurality of images depicting portions of vehicles including damage may include 10 or more images, 100 or more images, 1,000 or more images, etc. For any particular vehicle, multiple images of one or more portions having damage may be obtained.

In some embodiments, another plurality of images of vehicles may be obtained, where the images may also depict various portions of various vehicles; however, the portions depicted may not include damage. For example, an image may depict a front bumper of the first automobile without a dent. As another example, an image may depict a backseat of the second automobile without a stain. In some embodiments, for at least some of the images depicting portions of vehicles including damage, another image depicting the same portion of the same vehicle excluding damage may be obtained.

In some embodiments, the images of the vehicles including portions not having damage may be obtained from one or more vehicle manufacturers or from one or more knowledge archives. For example, the images may be obtained from a vehicle manufacturer upon request from a vehicle retailer, the images may be downloaded from a web site of the vehicle manufacturer, or the images may be obtained from an individual via an image capturing device (e.g., a camera). The images of the vehicles including portions not having damage may be stored in a database (e.g., non-damaged vehicle image database 134). The plurality of images depicting portions of vehicles excluding damage may include 10 or more images, 100 or more images, 1,000 or more images, etc. For any particular vehicle, multiple images of one or more portions not having damage may be obtained.

In some embodiments, training data for a prediction model (e.g., prediction model training data) may be generated based on the plurality of images depicting portions of vehicles including damage and the plurality of images depicting portions of vehicles excluding damage. The training data may include at least some of the images depicting portions of vehicles including damage and at least some of the images depicting portions of vehicles excluding damage. The training data may also include information about each of the images, such as an identifier of a vehicle type, sub-type, angle, lighting condition, portion of vehicle identifier, etc. The training data may be provided to a prediction model to train the prediction model to determine a damage score for each image of a portion of a vehicle of having damage. For example, based on the training data, the prediction model may estimate a damage score of the first vehicle having the dent in the front bumper.

In some embodiments, the prediction model used to generate the precomputed damage scores may be a machine learning model. For example, the machine learning model may use the images of portions of vehicles excluding damage as labels for the images of portions of vehicles including damage when being trained. In some embodiments, the prediction model used to generate the precomputed damage scores may be a neural network. For example, the neural network may use the images of portions of vehicles excluding damage as reference feedback information for the images of portions of vehicles including damage in order to update one or more configurations (e.g., weights, biases) of the neural network.

Subsystems 112-116

Damage scoring subsystem 112 may be configured to determine a damage score for an image depicting a portion of a vehicle having damage. In some embodiments, the damage score may indicate a likelihood that an individual would purchase a vehicle having a given amount of damage. For example, an image of an automobile depicting a large dent in a driver-side door may receive a high damage score (e.g., score "80"), whereas an image of an automobile depicting a minor scratch to the rear bumper may receive a low damage score (e.g., score "20"). In some embodiments, the damage score may be a number between 0 and 100, where the lower the score, the greater the likelihood that an individual would purchase a given vehicle, and the higher the score, the smaller the likelihood that the individual would purchase the vehicle. Alternatively, a higher number damage score may indicate a greater likelihood that an individual would purchase a given vehicle, whereas a lower number damage score may indicate a smaller likelihood that the individual would purchase the given vehicle. In some embodiments, the damage score may be classified into a category indicative of a likelihood that an individual would purchase a vehicle. For example, the damage score associated with an image of a vehicle depicting a portion having damage may be classified into a first category indicating a low likelihood of purchase, a second category indicating a medium likelihood of purchase, or a third category indicating a high likelihood of purchase. Any number of categories may be used (e.g., five categories, ten categories, etc.), and the use of three is merely exemplary.

In some embodiments, damage scoring subsystem 112 may obtain a plurality of images, where each image may depict a portion of a vehicle having an amount of damage. In some embodiments, images may be captured by client device 104 and provided to computer system 102 via network 150. Computer system 102 may store the images within damaged vehicle image database 132 via network 150. In some embodiments, the images may be provided to damaged vehicle image database 132 from client device 104 via network 150. In some embodiments, the images of portions of vehicles including damage may be obtained from damaged vehicle image database 132 in response to a request to generate training data for a prediction model used to compute damage scores. For example, damage scoring subsystem 112 may generate a request to train the prediction model periodically, such as every day, every week, every month, etc. Alternatively or additionally, damage scoring subsystem 112 may generate the request to train the prediction model in response to an event, such as a new collection of images being stored within damaged vehicle image database 132.

Figure 3A:
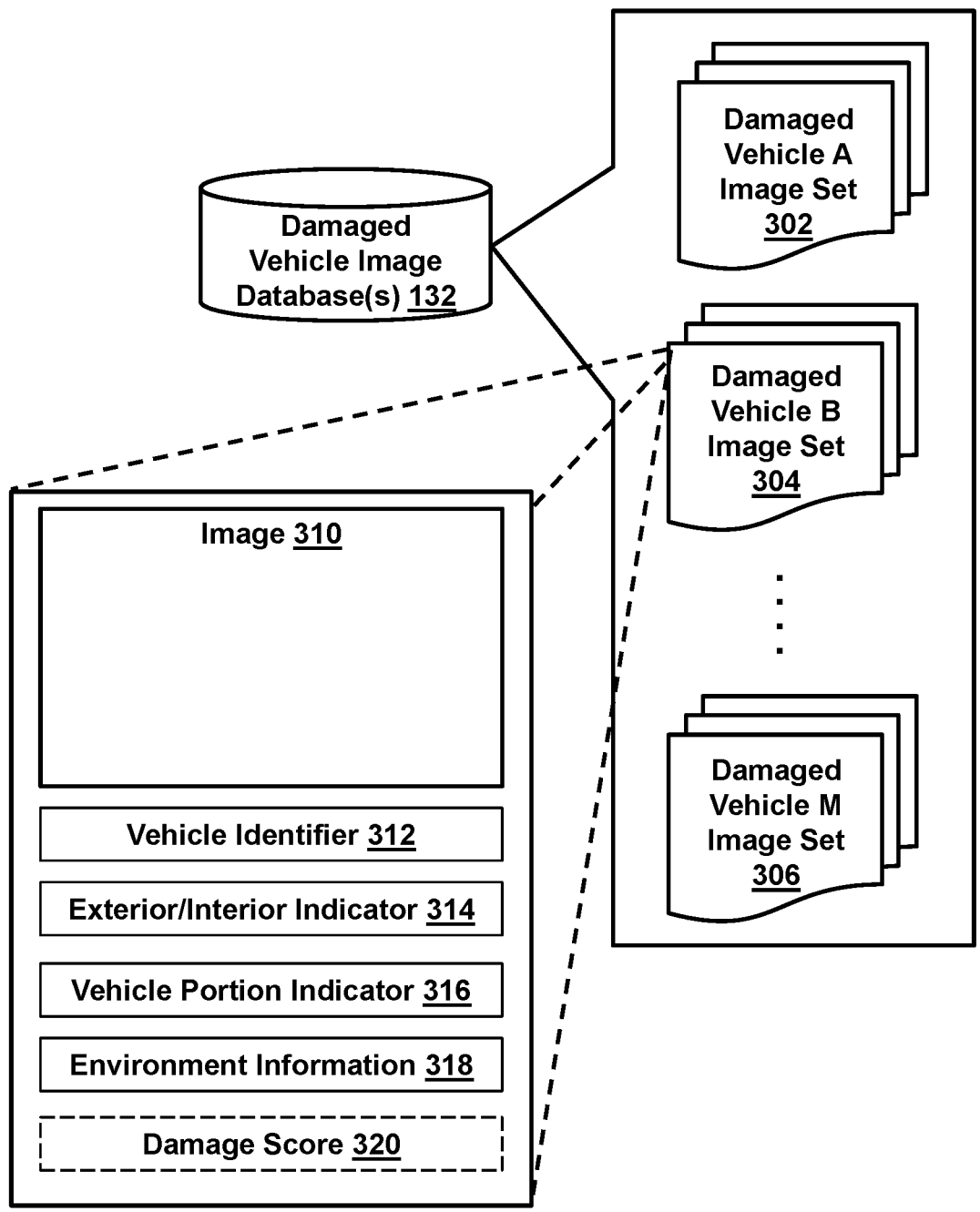
FIGS. 3A and 3B show a damaged vehicle image database and a non-damaged vehicle database, respectively, in accordance with one or more embodiments.

As an example, with reference to FIG. 3A, damaged vehicle image database 132 may include image sets 302-306, each of which may relate to a particular vehicle. For instance, damaged vehicle A image set 302 may include a set of images depicting a first vehicle (e.g., vehicle A), damaged vehicle B image set 304 may include a set of images depicting a second vehicle (e.g., vehicle B), and damaged vehicle M image set 306 may include a set of images depicting an M-th vehicle. Some embodiments may include each of image sets 302-306 including one or more images of a given vehicle. In some embodiments, damaged vehicle image database 132 may include any number of image sets (e.g., M may be 10, 100, 1,000, 10,000, or more). In some embodiments, different image sets may correspond to a same vehicle; however, these image sets may be combined into a larger image set including the images of each of the different image sets.

In some embodiments, each of image sets 302-306 may include one or more images depicting a corresponding vehicle. For instance, damaged vehicle B image set 304 may include images depicting various portions of vehicle B. Each portion of vehicle B depicted in a corresponding one of the images of damaged vehicle B image set 304 may be similar or may differ. For example, two images in damaged vehicle B image set 304 may both be of the front bumper of vehicle B showing the damage, albeit the two images may be captured from different perspectives, using different lighting, and/or using different devices.

In some embodiments, each image within a given image set may include image data as well as metadata associated with the image. For example, image 310 may be one image included within damaged vehicle B image set 304. Image 310 may include associated metadata, such as one or more of vehicle identifier 312, exterior/interior indicator 314, vehicle portion indicator 316, environment information 318, and optionally damage score 320. In some embodiments, vehicle identifier 312 may refer to an identifier of a particular vehicle (e.g., vehicle B) that is depicted in image 310. Vehicle identifier 312 may be determined using one or more image recognition algorithms trained to identify vehicles. Alternatively, vehicle identifier 312 may be input by an individual via computer system 102 and/or client device 104. For example, when capturing image 310, an individual may have the option to specify vehicle identifier 312. In some embodiments, vehicle identifier 312 may be a character string of a preselected length (e.g., 8-20 alphanumeric characters). In some embodiments, vehicle identifier 312 may be generated by computer system 102 or via an application program interface (API) of client device 104 based on features of the vehicle as selected by an individual capturing image 310. For example, an individual may input or select a make and/or model of the vehicle, and in response, vehicle identifier 312 may be generated.

Exterior/Interior indicator 314 may indicate whether image 310 depicts an exterior of a vehicle or an interior of a vehicle. In some embodiments, exterior/interior indicator 314 may be a binary indicator, having a first value for images depicting a vehicle exterior and having a second value for images depicting a vehicle interior. For example, if image 310 depicts an exterior of a vehicle, then exterior/interior indicator 314 may include a value "1" (e.g., logical TRUE), whereas if image 310 depicts an interior of a vehicle, exterior/interior indicator 314 may include a value "0" (e.g., logical FALSE). In some embodiments, a vehicle depicted by image 310 may not include an interior (e.g., if the vehicle is a bicycle), and therefore exterior/interior indicator 314 may not be included.

Vehicle portion indicator 316 may indicate a portion of a vehicle depicted within image 310. In some embodiments, a vehicle may be conceptually partitioned into portions by computer system 102. For example, a vehicle may be partitioned into a front portion, a middle portion, and a rear portion. As another example, various portions of a vehicle may be specified by an individual via computer system 102 and/or client device 104. The various portions may include front, middle, rear, right, left, bottom, top, etc. As still yet another example, the various portions of the vehicle may be indicated by the portion's name, such as "driver's door," "back bumper passenger side," "passenger seat," and "rear window." Any suitable partitioning schema may be used and/or specified, and the aforementioned is merely exemplary. In some embodiments, the portions may be determined using a trained image recognition model configured to identify vehicle portions based on pre-selected images of specific portions of various vehicles. For instance, the trained image recognition model may be configured to recognize that image 310 is of a steering wheel by detecting the presence of an object matching a steering wheel within image 310.

Environment information 318 may include information regarding the background environment of image 310 when captured. For example, environment information 318 may include information regarding an amount of ambient light detected within image 310 or detected by an image capturing component used to capture image 310. Environment information 318 may also include an angle (e.g., with respect to a gravity vector) or orientation (e.g., landscape, portrait, etc.) of the image capturing component when image 310 was captured. Environment information 318 may also include temperature information of the environment where image 310 was captured, device information indicating a type of device that was used to capture image 310, location information (e.g., a GPS location) of where image 310 was captured, and any other information associated with a captured image.

Damage score 320 may include a damage score computed by computer system 102 for a portion of a vehicle depicted in image 310. In some embodiments, as described below, damage score 320 may be computed using a prediction model trained based on training data generated from image sets 302-306. As detailed below, damage score 320 may be generated by the trained prediction model and stored in score database 140. In some embodiments, the damage score may also be stored in damaged vehicle image database 132, for example via damage score 320. Some embodiments may include damage score 320 being a pointer to a location in score database 140 where the damage score for the vehicle depicted in image 310 may be stored.

Damage scoring subsystem 112 may be configured to obtain a plurality of images of portions of vehicles not including damage. For example, the images of portions of vehicles excluding damage may be stored in non-damaged vehicle image database 134. In some embodiments, the images of portions of vehicles excluding damage may be captured by client device 104 and/or received from a vehicle manufacturer. For example, damage scoring subsystem 112 may be configured to retrieve images of portions of vehicles excluding damage from a vehicle manufacturer's website or from a search of the Internet for images of the vehicle.

Figure 3B:
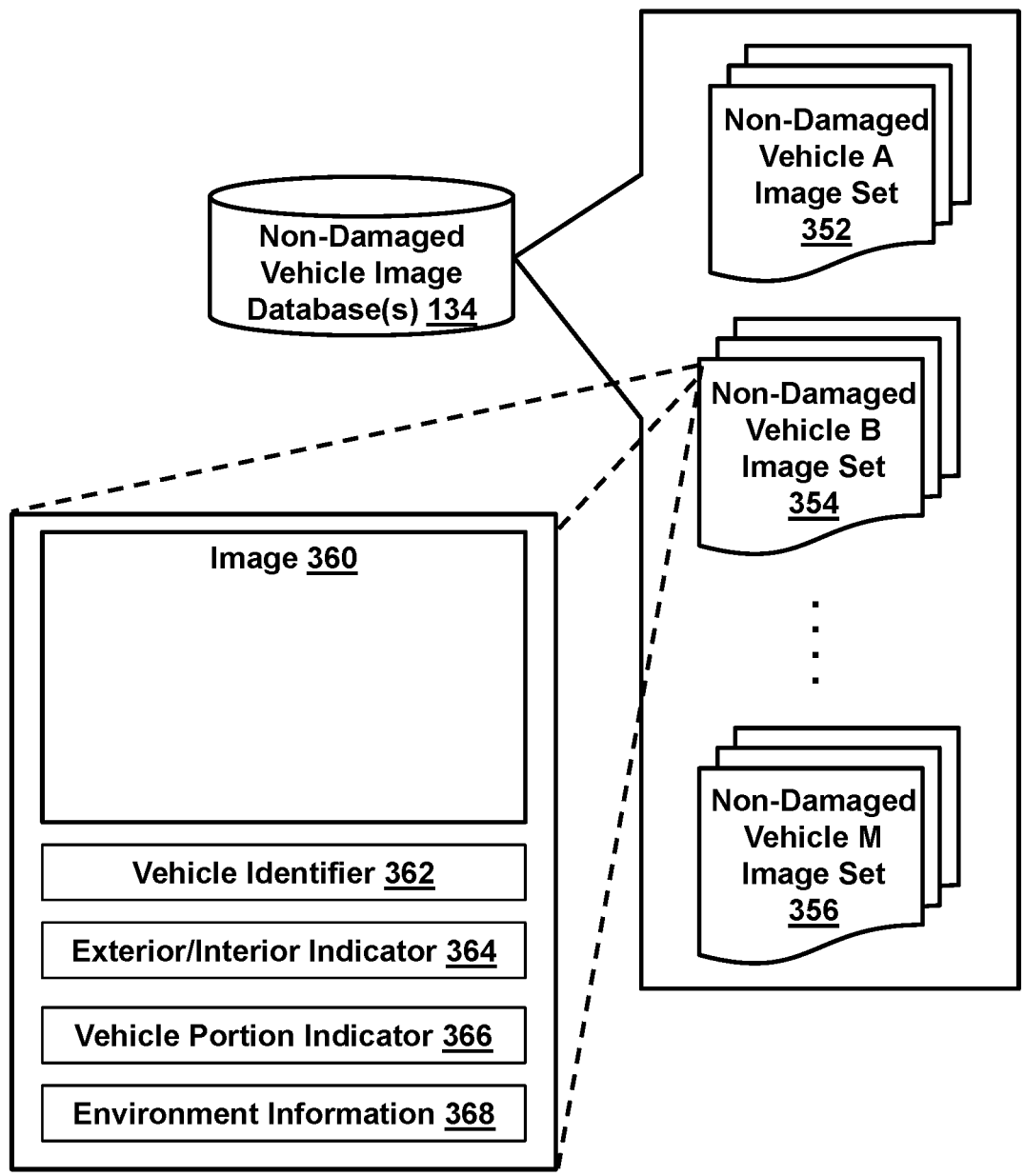

As an example with reference to FIG. 3B, non-damaged vehicle image database 134 may include image sets 352-356, each of which may relate to a particular vehicle. For instance, non-damaged vehicle A image set 352 may include one or more images depicting a first vehicle (e.g., vehicle A), non-damaged vehicle B image set 354 may include one or more images depicting a second vehicle (e.g., vehicle B), and non-damaged vehicle M image set 356 may include one or more images depicting an M-th vehicle. In some embodiments, image sets 352-356 may be associated with a same vehicle as that of image sets 302-306, respectively. For example, damaged vehicle A image set 302 may include images depicting portions of vehicle A including damage, while non-damaged vehicle A image set 352 may include images depicting some or all of the portions of vehicle A excluding damage.

In some embodiments, each image included within one of image sets 352-356, such as image 360, may include one or more of a vehicle identifier 362, an exterior/interior indicator 364, a vehicle portion indicator 366, and environment information 368. Vehicle identifier 362, an exterior/interior indicator 364, a vehicle portion indicator 366, and environment information 368 may be substantially similar to vehicle identifier 312, an exterior/interior indicator 314, a vehicle portion indicator 316, and environment information 318, with the exception that the former refers to image 360 depicting a vehicle excluding damage. In some embodiments, computer system 102 may organize each image included within image sets 302-306 and 352-356 such that a same schema is used for vehicle identifiers, exterior/interior indicators, vehicle portion indicators, and environment information.

In some embodiments, damage scoring subsystem 112 may be configured to obtain a first image of a portion of a vehicle including damage from damaged vehicle image database 132 as well as a second image of a portion of the same vehicle excluding damage from non-damaged vehicle image database 134. The portion of the vehicle depicted in the first image and the second may be the same or different depending on whether an image of the same portion of the same vehicle is stored in both damaged vehicle image database 132 and non-damaged vehicle image database 134. In some embodiments, damage scoring subsystem 112 may be configured to determine vehicle identifiers of the vehicles depicted in each of the images of portions of damaged vehicles. Upon determining the vehicle identifiers for each of the images, which may be identified from an image's metadata, damage scoring subsystem 112 may query non-damaged vehicle image database 134 to determine whether any images of vehicles having one of the corresponding vehicle identifiers is stored therein. The images with matching vehicle identifiers may be retrieved from non-damaged vehicle image database 134 from damage scoring subsystem 112.

Figure 4:
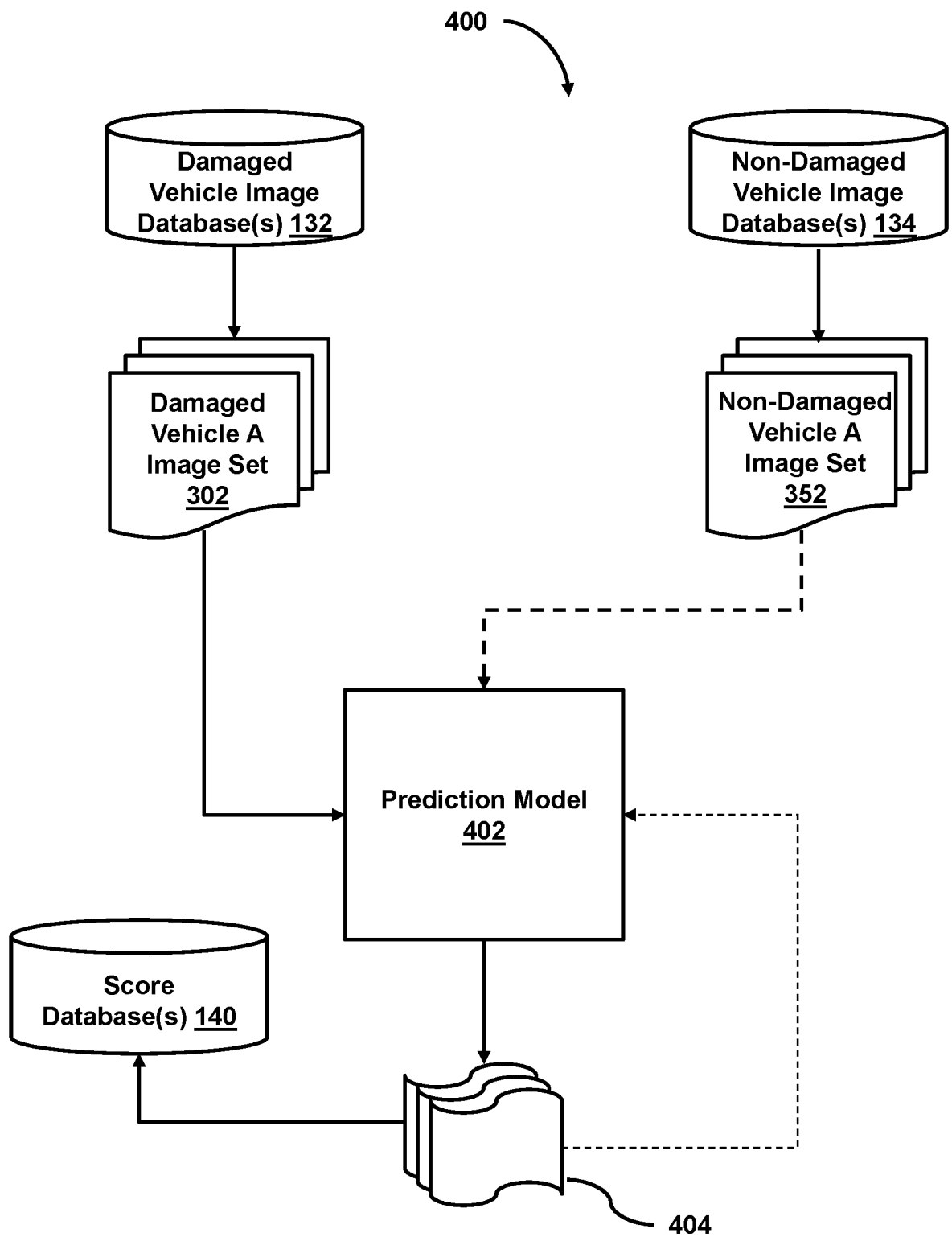
FIG. 4 shows a system for facilitating training of a prediction model to compute a damage score for a vehicle depicted in an image, in accordance with one or more embodiments.

In some embodiments, damage scoring subsystem 112 may be configured to generate prediction model training data based on the images of portions of vehicles having damage and the images of portions of vehicles not having damage. For example, with reference to FIG. 4, a system 400 for facilitating training of a prediction model to compute a damage score for a vehicle depicted in an image is shown. The generated prediction model training data may be stored in training data database 136, which may be retrieved upon request in order to train a prediction model. In some embodiments, the prediction model training data may be used to train a prediction model configured to generate damage scores for each image. For example, as illustrated by FIG. 4, damage scoring subsystem 112 may retrieve, or cause to be retrieved, one or more image sets from each of damaged vehicle image database 132 and non-damaged vehicle image database 134, such as damaged vehicle A image set 302 and non-damaged vehicle A image set 352.

In some embodiments, damage scoring subsystem 112 may provide a notification to model subsystem 116 to indicate that a prediction model for generating damage scores is to be trained. In response to the notification, model subsystem 116 may retrieve a prediction model from model database 138 as well as prediction model training data from training data database 136. Some embodiments may include selecting the prediction model based on the desired task; however, damage scoring subsystem 112 may additionally or alternatively provide an indication of the type of prediction model to be selected via the notification. For example, damage scoring subsystem 112 may indicate that the prediction model to be trained for generating damage scores may be a machine learning model. Model subsystem 116 may therefore be configured to select a machine learning model from model database 138 and provide the machine learning model to damage scoring subsystem 112 for training. Alternatively, model subsystem 116 may be configured to perform the prediction model training.

Some embodiments may also include damage scoring subsystem 112 indicating, for example via the notification, to model subsystem 116 which training data is to be retrieved to train a prediction model. For example, damage scoring subsystem 112 may indicate that the prediction model training data, generated based on damaged vehicle A image set 302 and non-damaged vehicle A image set 352, should be retrieved and used to train a prediction model 402. In some embodiments, the training data may be retrieved based on a recency of when the training data was generated, a particular type or types of vehicles that the prediction model is to be trained for, etc.

Upon the prediction model and prediction model training data being retrieved, damage scoring subsystem 112 and/or model subsystem 116 may be configured to cause the prediction model to be trained. In some embodiments, training prediction model 402 may include providing prediction model 402 with the training data (e.g., formed based on damaged vehicle A image set 302 and non-damaged vehicle A image set 352), and collecting damage scores 404 output from prediction model 402. Damage scores 404 may indicate an estimated likelihood that an individual would purchase a vehicle depicted in an image given an amount of damage to a portion of the vehicle. In some embodiments damage scores 404 may be stored in score database 140, and may include an indication of the associated image with which the damage score relates. For example, score database 140 may store a damage score X1 for an image I1 having an image identifier ID1 depicting a portion P1 of a vehicle V1. Damage score X1 may include a pointer to image identifier ID1 of image I1 within damaged vehicle image database 132 such that the damage score X1 may be referenced upon the image I1 being retrieved (e.g., for user threshold estimation training). For example, upon image 310 of FIG. 3A being retrieved, damage score 320 may be obtained via a pointer to a damage score stored in score database 140 for image 310. Damage score X1 may also include another pointer to an image identifier ID2 of an image I2 within non-damaged vehicle image database 134, where image I2 may correspond to portion P1 of vehicle V1 excluding damage. In some embodiments, damages scores 404, upon being computed for a given image set, may be referred to as precomputed damage scores. For instance, when training a prediction model to estimate a threshold score for one or more users indicating a user's tolerance for vehicle damage, images depicting portions of vehicles having damage may be obtained, and the images may each be associated with a precomputed damage score. The precomputed damage scores may, for example, be generated based on damage scores 404 generated by prediction model 402, or may be damage scores 404.

In some embodiments, damage scores 404 may be provided back to prediction model 402 as reference feedback (e.g., as the target output indications). Prediction model 402 may assess damage scores 404 output thereby based on the reference feedback and update one or more configurations of prediction model 402 based on the assessment. For example, prediction model 402 may update its configurations (e.g., weights, biases, or other parameters) based on the assessment. In some embodiments, damage scores 404 may be provided to prediction model 402 and viewed by an individual via computer system 102 and/or client device 104 to provide feedback as to the quality of the damage score generated. For example, an image (e.g., image 310) of a portion of a vehicle including damage may be presented to an individual via client device 104 along with the computed damage score 404 for the image. The individual may provide an indication of whether he/she agrees with the computed damage score 404, and/or a revised score based on the individual's own assessment in view of the computed damage score 404 and the image. Prediction model 402 may then be updated based on the individual's analysis of the computed damage score 404, as well, or alternatively, the revised score provided by the individual.

Returning to FIG. 1, threshold training subsystem 114 may be configured to train a prediction model (which may differ from the prediction model trained via damage scoring subsystem 112) to estimate a threshold score for one or more users indicating a user tolerance for vehicle damage. In some embodiments, threshold training subsystem 114 may provide images to an individual operating client device 104, where each image depicts a portion of a vehicle having a particular amount of damage and also is associated with a precomputed damage score indicating a likelihood that an individual would purchase a vehicle if that vehicle had the particular amount of damage. For example, image 310 of FIG. 3A may be provided to client device 104 and may have an associated damage score 320 that has been precomputed. In some embodiments, the precomputed damage score for each image depicting a portion of a vehicle having damage may not be provided to client device 104. For instance, threshold training subsystem 114 may log and/or retrieve the precomputed damage score associated with the provided images, however the precomputed damage scores may not be displayed via client device 104 so as to not sway an individual's opinion regarding the depicted vehicle.

Figure 5A:
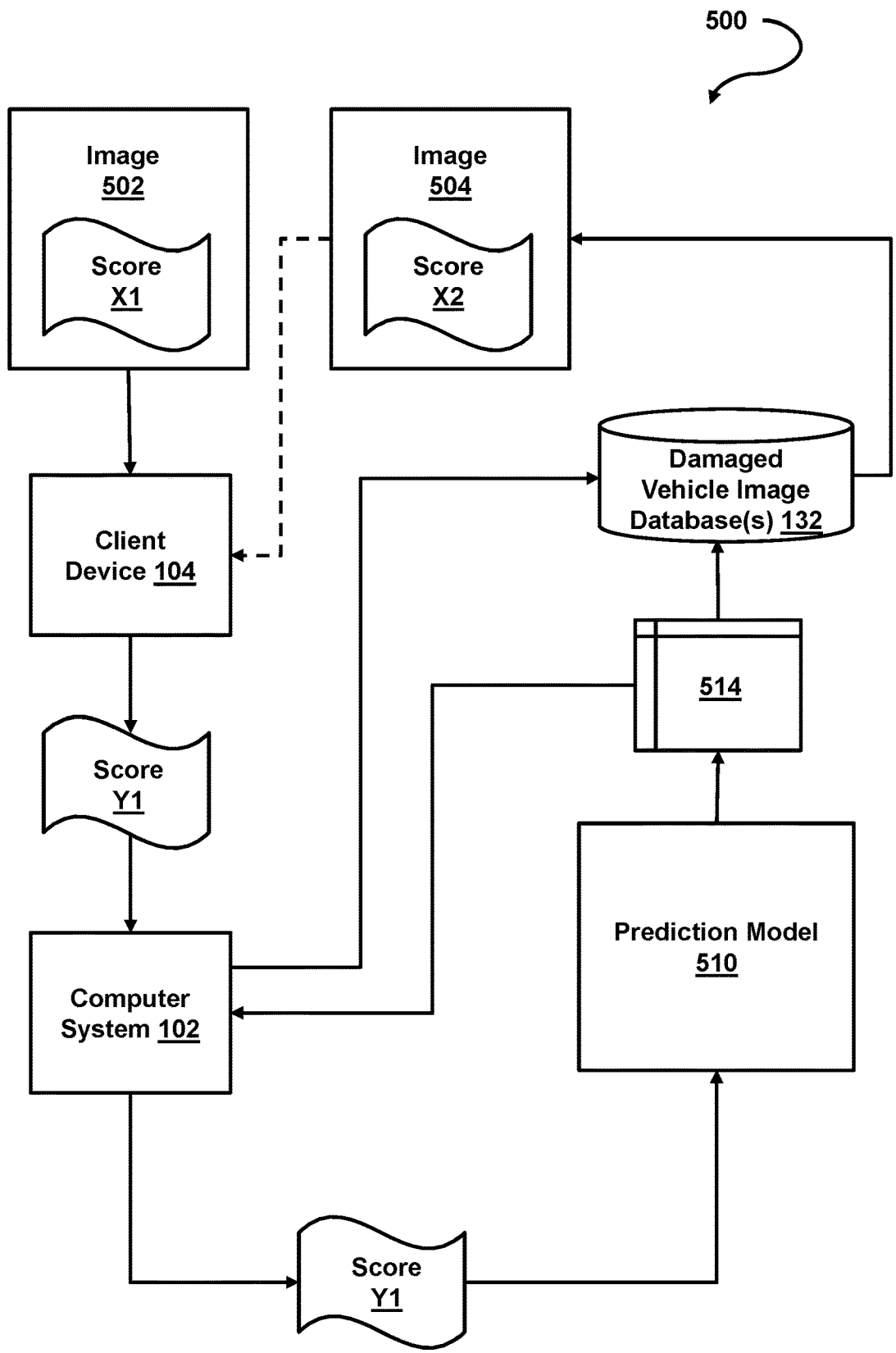
FIGS. 5A and 5B show systems for generating training data based on images provided to a client device that are selected based on a candidate threshold score output from a prediction model, in accordance with one or more embodiments.

As an example, with reference to FIG. 5A, a process 500 may include a first image 502 provided to client device 104. First image 502 may be associated with a first precomputed damage score X1, which may have been determined via a prediction model trained by damage scoring subsystem 112, as described above. In some embodiments, first image 502 may be randomly selected from a collection of images depicting portions of vehicles having damage. For example, first image 502 may be selected from images stored in damaged vehicle image database 132. In some embodiments, first image 502 may be randomly selected by a prediction model, such as prediction model 510. Prediction model 510 may, for example, be a neural network configured to estimate a candidate threshold score 514 of a user based on a precomputed damage score of an image and a user-provided score for that image. The precomputed damage scores associated with an image may be generated, in some embodiments, from damage scores 404 generated by prediction model 402.

After providing first image 502 to client device 104, threshold training subsystem 114 of computer system 102 may be configured to receive a first user-provided score Y1 from client device 104. First user-provided score Y1 may indicate whether the individual operating client device 104 would purchase a vehicle having a same or similar amount of damage as that of the vehicle depicted in first image 502. In some embodiments, first user-provided score Y1 may be a numerical value indicating the individual's likelihood to purchase a vehicle having the same or similar amount of damage as that of the vehicle depicted in first image 502. For example, first user-provided score Y1 may be a number between 0 and 100, where 0 may indicate a smallest probability that the individual would purchase the vehicle depicted within first image 502, and 100 may indicate a largest probability that the individual would purchase the vehicle. In some embodiments, first user-provided score Y1 may be a value indicative of whether the individual would purchase a vehicle having the same or similar amount of damage as that of the vehicle depicted in first image 502. For example, first user-provided score Y1 may be a first value (e.g. YES, logical TRUE, binary 1, etc.) indicating that the individual would purchase a vehicle having a same or similar amount of damage as that of the vehicle depicted within first image 502, or a second value (e.g., NO, logical FALSE, binary 0, etc.) indicating that the individual would not purchase a vehicle having a same or similar amount of damage as that of the vehicle depicted within first image 502. In this example, if the individual provides the first value, then first user-provided score Y1 may be set as being first precomputed damage score X1. However, if the individual provides the second value, then computer system 102 may indicate to prediction model 510 that a new image is to be selected, where the new image is selected having a precomputed damage score that differs from first precomputed damage score X1. For instance, the new image may have a precomputed damage score that is greater than first precomputed damage score X1, as first precomputed damage score X1 may serve as an initial lower bound for candidate threshold score 514. In other words, because the individual indicates that he/she would not purchase a vehicle having a same or similar amount of damage as that of the vehicle depicted within first image 502, this indicates that candidate threshold score 514 for the individual is greater than first precomputed damage score X1.

In some embodiments, upon receiving first user-provided score Y1, computer system 102 may provide first user-provided score Y1 to prediction model 510. For instance, threshold training subsystem 114 and/or model subsystem 116 may provide first user-provided score Y1 to prediction model 510. In some embodiments, prediction model 510 may generate candidate threshold score 514 based on first user-provided score Y1. In some embodiments, prediction model 510 may generate candidate threshold score 514 based on first user-provided score Y1 and first precomputed damage score X1. After candidate threshold score 514 is estimated, computer system 102 may obtain candidate threshold score 514 from prediction model 510 and may select a second image 504 from damaged vehicle image database 132.

In some embodiments, second image 504 may be selected based on candidate threshold score 514. Some embodiments include randomly selecting second image 504 from images stored within damaged vehicle image database 132 based on candidate threshold score 514. For example, second image 504 may depict a second portion of a second vehicle having a second amount of damage, and second image 504 may also be associated with a second precomputed damage score X2. Second image 504 may be selected from some or all of the images stored within damaged vehicle image database 132. For example, second image 504 may be selected from one or more images stored in damaged vehicle image database 132 that are associated with a precomputed damage score greater than or equal to candidate threshold score 514. After second image 504 is selected, threshold training subsystem 114 of computer system 102 may cause second image 504 to be provided to client device 104.

Figure 5B:
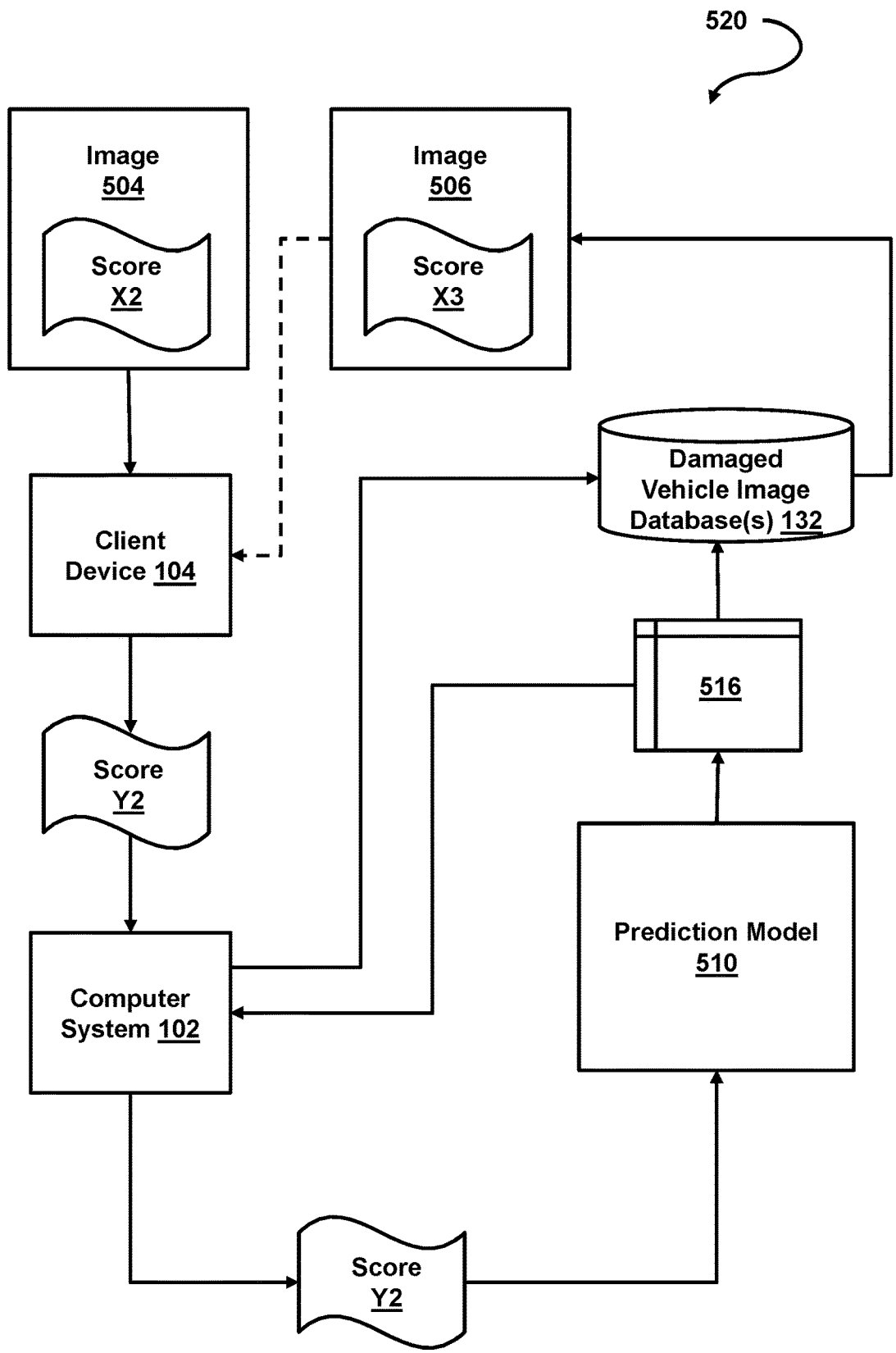

For example, as seen with reference to FIG. 5B, a process 520 may include providing second image 504 to client device 104. In some embodiments, process 520 may be a continuation of process 500 of FIG. 5A. For example, in response to determining that a difference between candidate threshold score 514 and first user-provided score Y1 does not satisfy a convergence condition, computer system 102 may be configured to select second image 504 from damaged vehicle image database 132 and provide second image 504 to client device 104. In some embodiments, the convergence condition may refer to a condition whereby the difference between a threshold score output from prediction model 510 and a user-provided score input to prediction model 510 is less than a threshold value. For example, if a difference between candidate threshold score 514 and first user-provided score Y1 is less than a threshold value $\alpha$, then candidate threshold score 514 may be used as a threshold score for one or more users of computer system 102, such that a user would consider purchasing vehicles having damage scores greater than or equal to the threshold score. Threshold value $\alpha$ may be any numerical value, for example, a number selected within a range of 0.001-0.01, 0.01-0.1, 0.1-1.0, 1-5, and the like. Threshold value $\alpha$ may, as another example, be an upper bound for the difference between candidate threshold score 514 and first user-provided score Y1, such as an upper bound of 1, 2, 5, or 10, however other values may be used alternatively and the aforementioned is merely illustrative. If, however, the difference between candidate threshold score 514 and first user-provided score Y1 does satisfy the convergence condition, then second image 504 may be selected and provided to client device 104.

In some embodiments, process 520 may include second image 504 being provided to client device 104 in response to computer system 102 determining that the convergence condition was not satisfied. Client device 104 may be configured to present second image 504 depicting a portion of a second vehicle having a second amount of damage. Additionally, second image 504 may be associated with a second precomputed damage score X2. A user operating client device 104 may input second user-provided score Y2 in response to viewing second image 504, and client device 104 may provide second user-provided score Y2 to computer system 102. Second user-provided score Y2 may indicate whether the user would consider purchasing a vehicle having a same or similar amount of damage as that of the vehicle depicted within second image 504. Computer system 102 may be configured to provide second user-provided score Y2 to prediction model 510, which may estimate a candidate threshold score 516 based on second user-provided score Y2. In some embodiments, candidate threshold score 516 may be estimated based on one or more of second user-provided score Y2, second precomputed damage score X2, first precomputed damage score X1, or first user-provided score Y1.

Candidate threshold score 516 may be provided to computer system 102 to determine whether candidate threshold score 516 satisfies the convergence condition with respect to second user-provided score Y2. If so, candidate threshold score 516 may be set as the threshold score. However, if the convergence condition is not satisfied, computer system 102 may be configured to cause a new image to be selected from damaged vehicle image database 132 based on candidate threshold score 516. For example, computer system 102 may select third image 506 based on candidate threshold score 516, where third image 506 may depict a portion of a third vehicle having a third amount of damage, and also where third image 506 is associated with a third precomputed damage score X3. In this example, third precomputed damage score X3 may be selected based on third precomputed damage score X3 being greater than or equal to candidate threshold score 516. Third image 506 may be provided to client device 104, and process 500 and 520 may be repeat. For instance, process 500 and 520 may repeat a finite number of times (e.g., N iterations) or may repeat until the convergence condition is satisfied.

Figure 5C:
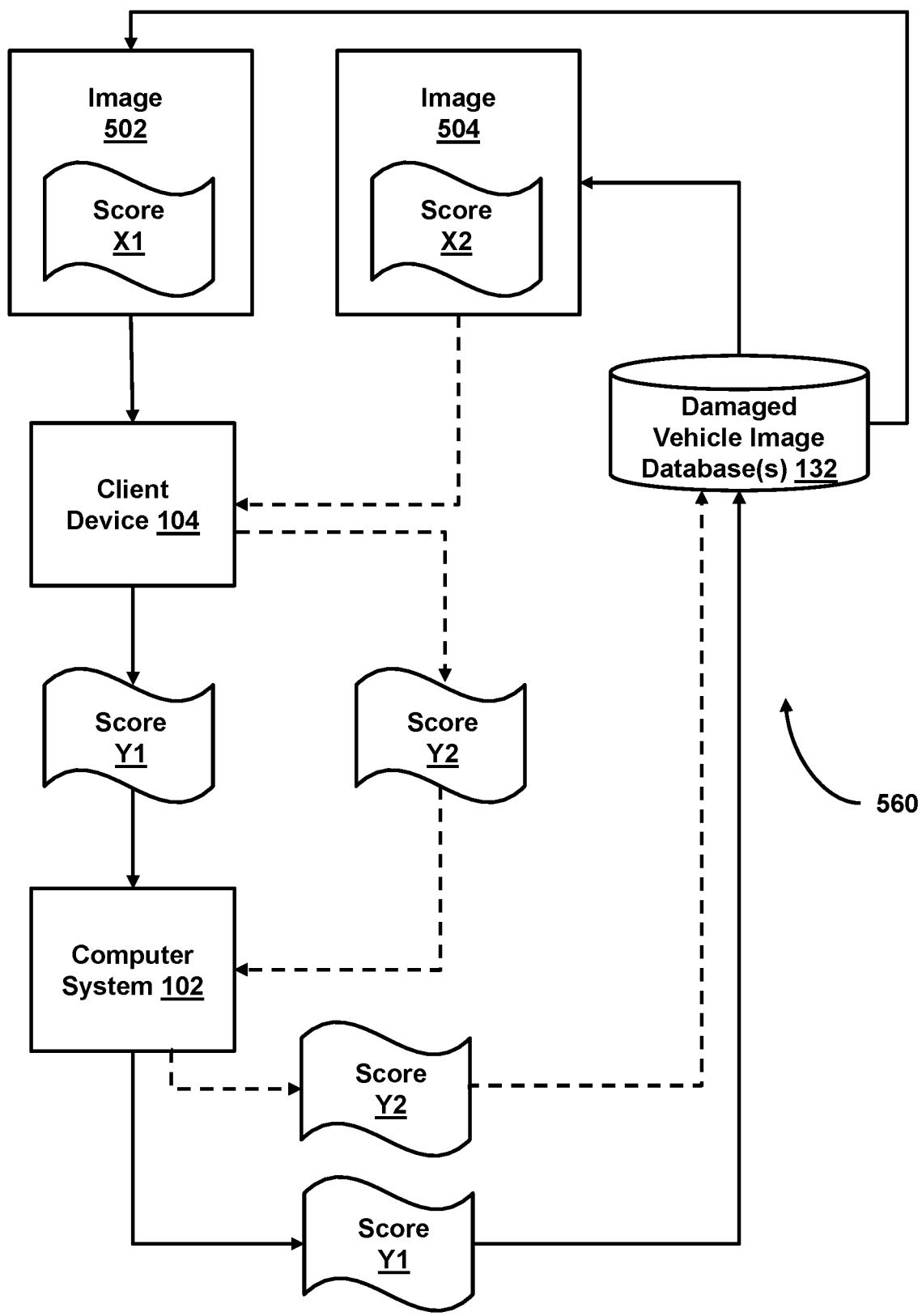
FIG. 5C shows a system for generating training data based on images provided to a client device that are selected based on a user-provided score for an image, in accordance with one or more embodiments.

In some embodiments, each image may be provided to client device 104 by computer system 102 without prediction model 510 estimating candidate threshold scores 514 or 516. For example, with reference to FIG. 5C, a process 560 is described whereby threshold training subsystem 114 of computer system 102 may be configured to randomly select first image 502 from damaged vehicle image database 132. First image 502 may be provided to client device 104, whereby an individual operating client device 104 may input first user-provided score Y1. In some embodiments, threshold training subsystem 114 of computer system 102 may receive first user-provided score Y1, and may facilitate a selection of a new image from damaged vehicle image database 132 based on first user-provided score Y1. For example, computer system 102 may query damaged vehicle image database 132 and select an image stored therein that is associated with a precomputed damage score greater than or equal to first user-provided score Y1. As another example, computer system 102 may query be configured to query damaged vehicle image database 132 and select an image stored therein that is associated with a precomputed damage score less than or equal to first user-provided score Y1. As yet another example, computer system 102 may randomly select an image from damaged vehicle image database 132, where the random selection employs a normal distribution centered about first user-provided score Y1 to select the subsequent image.

In some embodiments, the new image selected may be second image 504 depicting a portion of a second vehicle and that is associated with second precomputed damage score X2. Second image 504 may be provided to client device 104, and the user operating client device 104 may input second user-provided score Y2 for second image 504. In some embodiments, computer system 102 may select a third image from damaged vehicle image database 132 based on second user-provided score Y2. Some embodiments may include repeating process 560 N times, where N is a number dynamically configurable by computer system 102, predetermined by threshold training subsystem 114, or both. For example, process 560 may repeat Ntimes or until a difference between one or more consecutively input user-provided scores is and their corresponding precomputed damage scores satisfies a convergence condition (e.g., the difference is less than a threshold value α, where threshold value α may be any numerical value within a range of 0.001-0.01, 0.01-0.1, 0.1-1.0, 1-5, etc.). As another example, process 560 may repeat Ntimes, which may be a preselected number of iterations for process 560 (e.g., 10 iterations, 20 iterations, etc.).

Figure 5D:
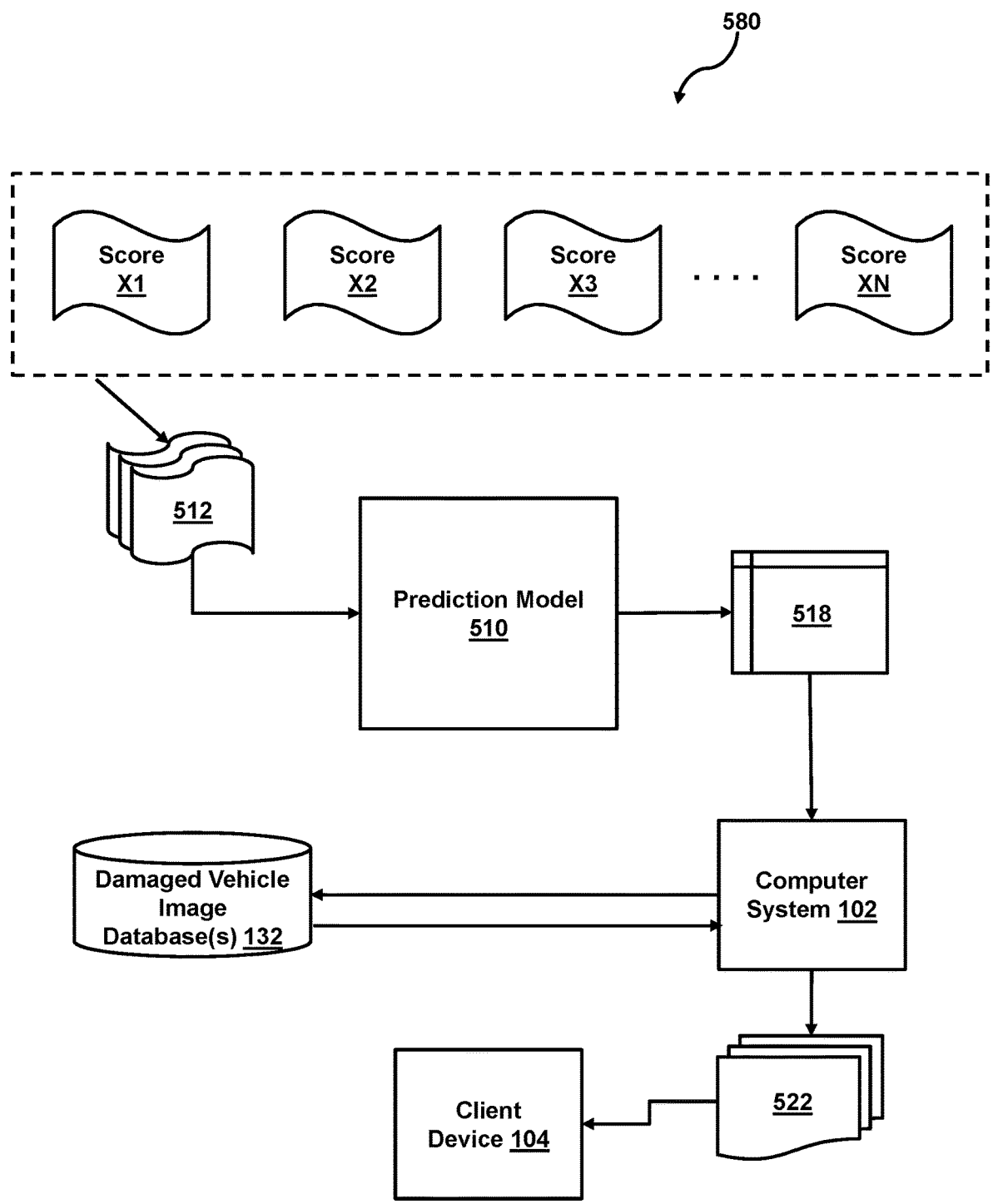
FIG. 5D shows a system for training a prediction model to estimate a threshold score for one or more users, in accordance with one or more embodiments.

In some embodiments, upon threshold training subsystem 114 determining that process 560 has repeated N times or that the convergence condition has been satisfied, training data may be generated for training a prediction model. As an example, with reference to FIG. 5D, a process 580 for training prediction model 510 may include generating training data 512 to be used to train prediction model 510. In some embodiments, training data 512 may be generated based on precomputed damage scores X1-XN. Each of precomputed damage scores X1-XN may be associated with one of the images provided to client device 104, with which a user-provided score is received (e.g., user-provided scores Y1, Y2). Furthermore, some embodiments may include precomputed damage scores X1-XN being generated based on damage scores 404 of FIG. 4. Training data 512 may, for example, include the precomputed damage scores of each of the images provided to client device 104.

In some embodiments, training data 512 may be provided to prediction model 510 to train prediction model 510 to estimate a threshold score 518 for one or more users based on training data 512. Threshold score 518 may be indicative of a user's tolerance for a vehicle having a given amount of damage. For instance, a user provided with images of vehicles having damage scores greater than candidate threshold score 514 may be less likely to purchase those vehicles than if the user was provided with images of vehicles having damage scores less than threshold score 518. In some embodiments, prediction model 510 may be a neural network, a machine learning model, or another type of prediction model.

In some embodiments, multiple threshold scores may be estimated. Each threshold score may correspond to a particular vehicle type, an exterior/interior of a vehicle, a demographic or geographic category of users, etc. For example, a threshold score for vehicle interiors and a threshold score for vehicle exteriors may be estimated. To estimate the threshold score for vehicle interiors, the images provided to client device 104 (e.g., first image 502, second image 504) may depict portions of interiors of vehicles. To estimate the threshold score for vehicle exteriors, the images provided to client device 104 (e.g., first image 502, second image 504) may depict portions of exteriors of vehicles. Similarly, the precomputed damage score for each image may be particular to the portion of the vehicle depicted within that image. For example, when estimating the threshold score for the interior of vehicles, precomputed damage scores X1 and X2 may refer to damage scores for portions of the interiors of the vehicles depicted in first image 502 and second image 504, respectively. In some embodiments, an overall threshold score may be generated based on the threshold score for the interior of vehicles and the threshold score for the exterior of vehicles. For example, the overall threshold score may be a (weighted or unweighted) combination of the threshold score for the interior of vehicles and the threshold score for the exterior of vehicles, a function of the threshold score for the interior of vehicles and the threshold score for the exterior of vehicles, or determined via another technique.

After threshold score 518 is estimated, computer system 102 may receive threshold score 518 and access damaged vehicle image database 132. Computer system 102 may be configured to select a set of images 522 depicting portions of vehicles having precomputed damage scores that are the same or similar to threshold score 518. In some embodiments, set of images 522 may be provided to client device 104 to be viewed by a user associated with client device 104. Some embodiments may include different client devices 104 within FIG. 5D as compared to FIGS. 5A-C, and thus a different user may be operating client device 104 of FIG. 5D as compared to FIG. 5A. Furthermore, prediction model 510 of FIGS. 5A and 5B may be the same or similar as prediction model 510 of FIG. D, or they may differ.

In some embodiments, after set of images 522 are provided to client device 104, a new user of client device 104 may provide an indication that he/she would purchase one (or more) of the vehicles depicted by set of images 522. For example, an image provided to client device 104 may depict a portion of a vehicle having an amount of damage, and the user operating client device 104 may indicate that he/she would be willing to purchase a vehicle having the same or similar amount of damage. Alternatively, in some embodiments after set of images 522 are provided to client device 104, the new user may provide another user-provided score for one or more of the images from set of images 522 indicating the likelihood that the individual would purchase a vehicle having a same or similar amount of damage as the vehicles depicted in set of images 522.

Some embodiments may include computer system 102 selecting a single image depicting a portion of a vehicle having an amount of damage from damaged vehicle image database 132 based on threshold score 518. The image, which may be associated with a precomputed damage score, may be provided to client device 104 and displayed to a user associated with client device 104. In some embodiments, the user may input an indication that he/she would purchase a vehicle having a same or similar amount of damage that the portion of the vehicle depicted in the image has, or the user may input a user-provided score for the image that indicates a likelihood that the user would purchase a vehicle having a same or similar amount of damage, and the indication or the user-provided score may be provided to computer system 102. In some embodiments, computer system 102 may cause the indication or the user-provided score to be provided to prediction model 510, which may estimate, or update a prior estimate of, a threshold score for the individual operating client device 104. In some embodiments, computer system 102 may be configured to retrieve content associated with one or more vehicles selected based on the estimated threshold score. The content may include images of the one or more vehicles. For example, the content may include images selected from damaged vehicle image database 132 based on the estimated threshold score and a precomputed damage score associated with each selected image. As another example, the content may include web resources (e.g., links to websites) where images of the vehicles may be viewed and/or information associated with the vehicles may be accessed.

Example Flowcharts

Figure 6:
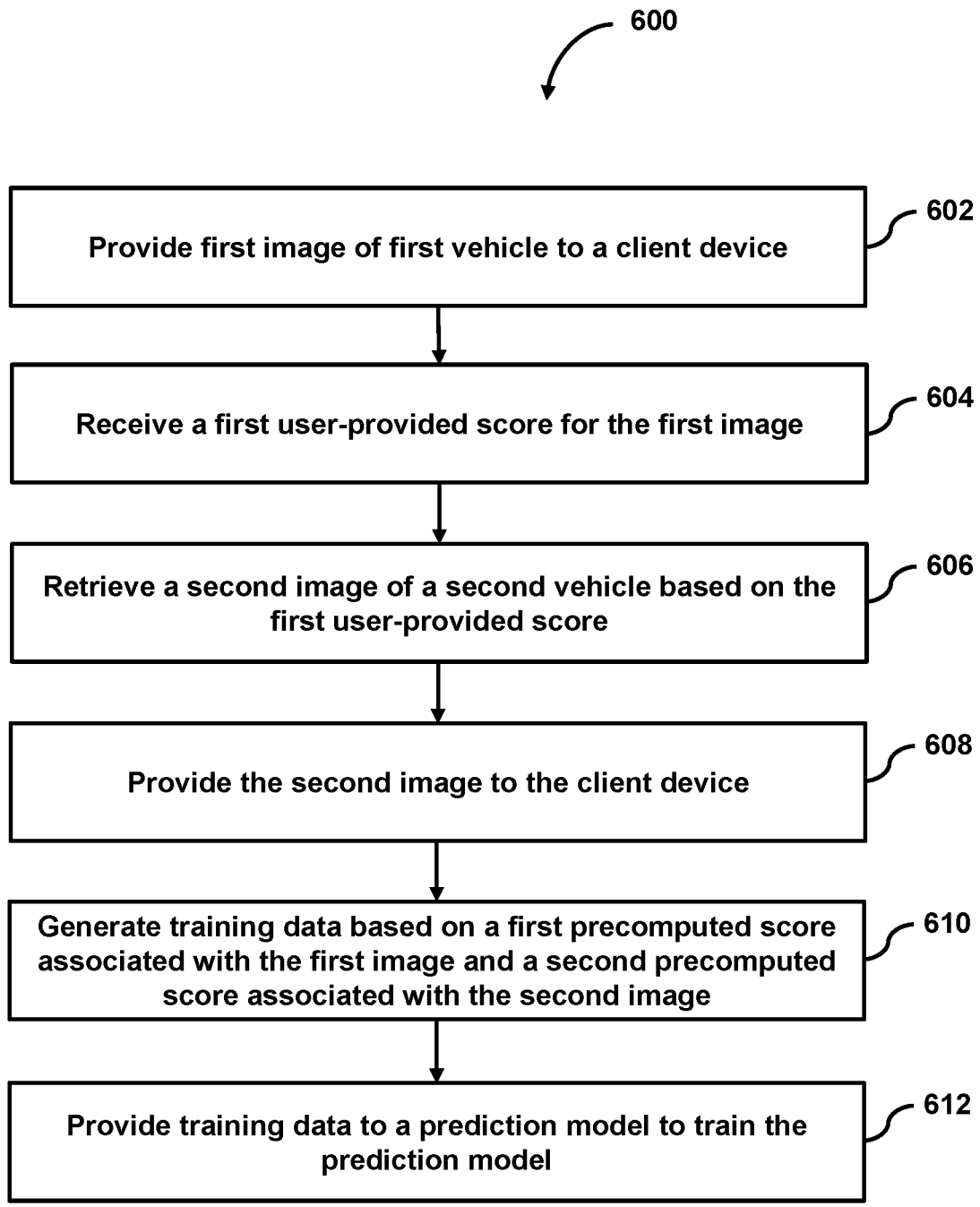
FIG. 6 shows a flowchart of a method for generating training data to train a prediction model to estimate a user's vehicle damage tolerance, in accordance with one or more embodiments.
Figure 7:
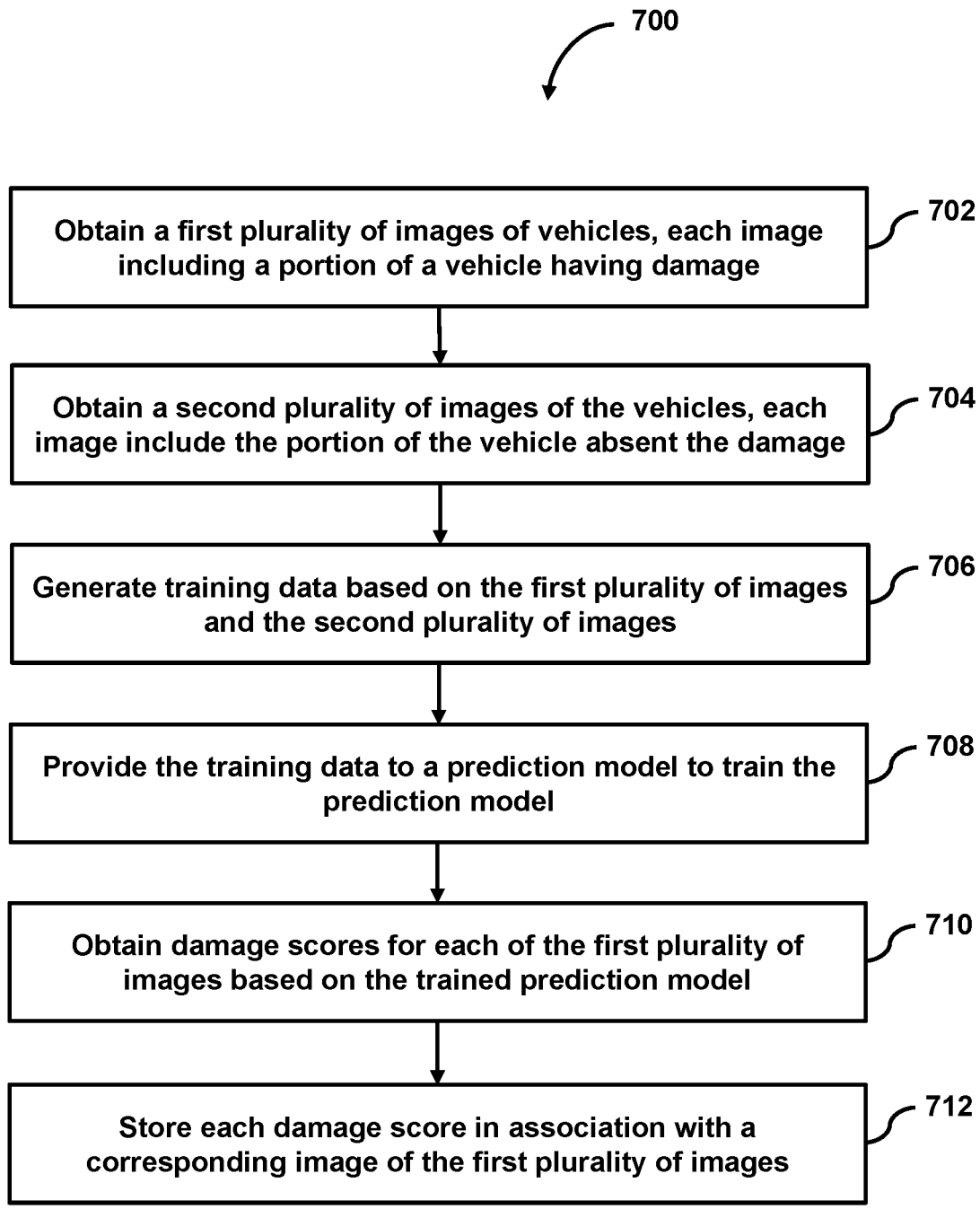
FIG. 7 shows a flowchart of another method for generating training data to train a prediction model to compute a damage score for a vehicle depicted in an image, in accordance with one or more embodiments.

FIGS. 6 and 7 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 6 shows a flowchart of a method 600 for generating training data to train a prediction model to estimate a user's vehicle damage tolerance, in accordance with one or more embodiments. In an operation 602, a first image of a first vehicle may be provided to a client device. In some embodiments, the first image may be randomly selected from damaged vehicle image database 132 by computer system 102 and provided to client device 104. The first image (e.g., first image 502) may be displayed by client device 104, for instance within a graphical user interface (GUI) rendered on a display component (e.g., a screen). In some embodiments, the first image may depict a portion of the first vehicle including a first amount of damage. For example, the first image may depict a front bumper of an automobile having a dent. In some embodiments, the first image may be associated with a first precomputed damage score indicating a predicted likelihood that an individual would purchase the vehicle having the first amount of damage. For example, first image 502 may be associated with first precomputed damage score X1. In some embodiments, operation 602 may be performed by a subsystem that is the same or similar to threshold training subsystem 114.

In an operation 604, a first user-provided score for the first image may be received. The first user-provided score may be input by an individual operating client device 104 in response to the first image being displayed thereon. For example, upon first image 502 being displayed by client device 104, the individual may be requested to input a score indicating whether that he/she would purchase a vehicle if that vehicle had the same or similar damage as that of the vehicle depicted within first image 502. The first user-provided score (e.g., first user-provided score Y1) may be received by computer system 102 from client device 104. In some embodiments, operation 604 may be performed by a subsystem that is the same or similar to threshold training subsystem 114.

In an operation 606, a second image of a second vehicle may be retrieved based on the first user-provided score. In some embodiments, computer system 102 may be configured to select a second image depicting a portion of a second vehicle having a second amount of damage from damaged vehicle image database 132, where the second image may be associated with a second precomputed damage score indicating a likelihood that an individual would purchase a vehicle having the second amount of damage. In some embodiments, computer system 102 may select the second image based on the first user-provided score and the second precomputed damage score associated with the second image. For example, computer system 102 may select second image 504 because second precomputed damage score X2 is greater than or equal to first user-provided score Y1. In some embodiments, computer system 102 may select second image 504 based on a candidate threshold score output by prediction model 510. For instance, computer system 102 may provide first user-provided score Y1 to prediction model 510, which may estimate candidate threshold score 514. Candidate threshold score 514 may then be used as an input for selecting second image 504. For instance, second image 504 may be selected based on second precomputed damage score X2 being greater than or equal to candidate threshold score 514. In some embodiments, operation 606 may be performed by a subsystem that is the same or similar to threshold training subsystem 114.

In an operation 608, the second image may be provided to the client device. For example, computer system 102 may cause second image 504 to be provided to client device 104. Upon receiving second image 504, client device 104 may be configured to cause second image 504 to be displayed. In some embodiments, the individual operating client device 104 may be requested to input a second user-provided score for second image 504 indicating whether the individual would purchase a vehicle having the second amount of damage. For example, computer system 102 may receive second user-provided score Y2 from client device 104 indicating whether the individual would purchase the vehicle depicted in second image 504. In some embodiments, operations 602-608 may be repeated N times, where N may be a predetermined number of iterations or a dynamically determined number of iterations. For example, operations 602-608 may repeat until a convergence condition is met, where the convergence condition corresponds to a difference between a user-provided score for an image and a precomputed damage score for an image being less than a threshold value (e.g., threshold value α). As another example, operations 602-608 may repeat a finite number of times, such as 10 times, so as to obtain a certain number of precomputed damage scores and user-provided scores. In some embodiments, operation 608 may be performed by a subsystem that is the same or similar to threshold training subsystem 114.

In an operation 610, training data may be generated based on a first precomputed damage score associated with the first image and a second precomputed damage score associated with the second image. For example, training data 512 may be generated based on first precomputed damage score X1 associated with first image 502 and second precomputed damage score X2 associated with second image 504. In some embodiments, the training data may be used to train a prediction model (e.g., prediction model 510), and may include first precomputed damage score X1 and second precomputed damage score X2, as well as additional precomputed damage scores associated with additional images provided to client device 104. In some embodiments, operation 610 may be performed by a subsystem that is the same or similar to threshold training subsystem 114, model subsystem 116, or a combination thereof.

In an operation 612, the training data may be provided to a prediction model to train the prediction model. For example, training data 512 may be provided to prediction model 510 to train prediction model 510 to estimate a threshold score 518 for one or more users indicating a tolerance for vehicle damage with respect to purchasing a vehicle. The threshold score may allow content to be filtered prior to being provided to a user such that the user is provided with images of vehicles having damage that the user would not consider to be an inhibiting factor in whether the vehicle would be purchased. In some embodiments, the prediction model (e.g., prediction model 510) may be a neural network, and the training data may be referred to as neural network training data. In some embodiments, operation 612 may be performed by a subsystem that is the same or similar to threshold training subsystem 114, model subsystem 116, or a combination thereof.

FIG. 7 shows a flowchart of another method 700 for generating training data to train a prediction model to compute a damage score for a vehicle depicted in an image, in accordance with one or more embodiments. In an operation 702, a first plurality of images of vehicles may be obtained, where each image includes a portion of a vehicle having damage. For example, damaged vehicle A image set 302 may be obtained from damaged vehicle image database 132. Each image included within damaged vehicle image set 302 may include an image of a vehicle, such as vehicle A, and may also include additional information. The additional information may include one or more of vehicle identifier 312, exterior/interior indicator 314, vehicle portion indicator 316, environment information 318, and damage score 320. In some embodiments, damage score 320 may be a precomputed damage score for an image indicating a likelihood that an individual would purchase a vehicle having an amount of damage that the vehicle depicted within the image has. The precomputed damage score may be determined based on the damage score. In some embodiments, damage score 320 may include a pointer to score database 140, where the pointer is directed to a precomputed damage score for the corresponding image. In some embodiments, operation 702 may be performed by a subsystem that is the same or similar to damage scoring subsystem 112.

In an operation 704, a second plurality of images of the vehicles may be obtained, where each image includes a portion of a vehicle without damage. For example, non-damaged vehicle A image set 352 may be obtained from non-damaged vehicle image database 134. Each image included within non-damaged vehicle image set 352 may include an image of a vehicle, such as vehicle A, and may also include additional information. The additional information may include one or more of vehicle identifier 362, exterior/interior indicator 364, vehicle portion indicator 366, and environment information 368. In some embodiments, operation 704 may be performed by a subsystem that is the same or similar to damage scoring subsystem 112.

In an operation 706, training data may be generated based on the first plurality of images and the second plurality of images. For example, training data may be generated based on damaged vehicle A image set 302 and non-damaged vehicle A image set 352. The training data may include damaged vehicle A image set 302 and non-damaged vehicle A image set 352, as well as one or more additional data sets selected from damaged vehicle image database 132 and non-damaged vehicle image database 134. In some embodiments, operation 706 may be performed by a subsystem that is the same or similar to damage scoring subsystem 112, model subsystem 116, or a combination thereof.

In an operation 708, the training data may be provided to a prediction model to train the prediction model. For instance, the training data may be provided to prediction model 402 to train prediction model 402 to generate precomputed damage scores for each image depicting a portion of a vehicle having damage. In some embodiments, operation 708 may be performed by a subsystem that is the same or similar to damage scoring subsystem 112, model subsystem 116, or a combination thereof.

In an operation 710, damage scores for each of the first plurality of images may be obtained based on the trained prediction model. In some embodiments, prediction model 402 may be configured to determine a precomputed damage score for each vehicle depicted in damaged vehicle A image set 302. For example, prediction model 402 may compute damage scores 404 based on the training data input to prediction model 402. In some embodiments, prediction model 402 may be a machine learning model, and the training data may be referred to as machine learning training data. In this example, the training data may include both damage vehicle A image set 302 (and/or other image sets from damaged vehicle image database 132) and non-damaged vehicle A image set 352 (and/or other image sets from non-damaged vehicle image database 134). In some embodiments, damage scores 404 may be provided back to prediction model 402 to be used as labels for training of prediction model 402. In some embodiments, prediction model 402 may be a neural network, and the training data may include damaged vehicle A image set 302. As an example, if prediction model 402 is a neural network, damage scores 404 may be used as reference feedback to update one or more configurations of the neural network. In some embodiments, operation 706 may be performed by a subsystem that is the same or similar to damage scoring subsystem 112, model subsystem 116, or a combination thereof.

In an operation 712, each damage score associated with a corresponding image from the first plurality of images may be stored. For example, the damage scores obtained for each image included within damaged vehicle A image set 302 may be stored in score database 140. In some embodiments, a point to each damage score may be stored as metadata with a corresponding image within damaged vehicle image database 132. In some embodiments, operation 706 may be performed by a subsystem that is the same or similar to damage scoring subsystem 112.

In some embodiments, the various computers and subsystems illustrated in FIG. 1 may include one or more computing devices that are programmed to perform the functions described herein. The computing devices may include one or more electronic storages (e.g., prediction database 130, which may include damaged vehicle image database 132, non-damaged vehicle image database 134, training data database 136, model database 138, score database 140, etc., or other electronic storages), one or more physical processors programmed with one or more computer program instructions, and/or other components. The computing devices may include communication lines or ports to enable the exchange of information with one or more networks (e.g., network(s) 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-116 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-116 described herein is for illustrative purposes, and is not intended to be limiting, as any of subsystems 112-116 may provide more or less functionality than is described. For example, one or more of subsystems 112-116 may be eliminated, and some or all of its functionality may be provided by other ones of subsystems 112-116. As another example, additional subsystems may be programmed to perform some or all of the functionality attributed herein to one of subsystems 112-116.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps/operations A, B, C, and D) encompasses both all such attributes or functions being mapped to all such objects and subsets of the attributes or functions being mapped to subsets of the attributes or functions (e.g., both all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors. Unless the context clearly indicates otherwise, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified (e.g., with explicit language like "after performing X, performing Y") in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The present techniques will be better understood with reference to the following enumerated embodiments:

1. A method, comprising: providing a first image of at least a first portion of a first vehicle to a client device, wherein the first image is associated with a first damage score; receiving, from the client device, a first user-provided score for the first image; providing, based on the first user-provided score, a second image of at least a second portion of a second vehicle to the client device, wherein the second image is associated with a second damage score; generating first training data based on the first damage score and the second damage score; and providing the first training data to a first prediction model to train the first prediction model to estimate a threshold score for a user.

2. The method of embodiment 1, further comprising: receiving a request for content regarding vehicles available for purchase by a first user; providing, for presentation to the first user, a third image of at least a third portion of a third vehicle, wherein the third image is associated with a third damage score; receiving feedback information indicating whether the first user would purchase a vehicle having an amount of damage indicative of the third damage score; providing the feedback information to the first prediction model; and receiving a threshold score for the first user estimated by the first prediction model based on the feedback information.

3. The method of embodiment 2, further comprising, providing, for presentation to the first user, content associated with one or more vehicles selected based on the threshold score.

4. The method of embodiment 2, wherein receiving the feedback information comprises: receiving an indication that the first user would purchase the vehicle having the amount of damage indicative of the third damage score; or receiving a second user-provided score for the third image.

5. The method of any of embodiments 1-4, further comprising: receiving, from the client device, a second user-provided score for the second image, wherein the first training data is generated based on a determination that the second damage score and the second user-provided score satisfy a convergence condition.

6. The method of any of embodiments 1-4, further comprising: receiving, from the client device, a second user-provided score for the second image; determining that the second damage score and the second user-provided score do not satisfy a convergence condition; providing, based on the second user-provided score, a third image of at least a third portion of a third vehicle to the client device, wherein the third image is associated with a third damage score; and determining whether the third damage score and a third user-provided score for the third image satisfy the convergence condition.

7. The method of embodiment 6, wherein the third damage-score and the third user-provided score are determined to not satisfy the convergence condition, the method further comprises: (a) selecting an image of at least a portion of another vehicle, the image being associated with a corresponding damage score; (b) providing the image to the client device; (c) receiving a user-provided score from the client device for the image; and (d) determining whether the damage score associated with the image and the user-provided score satisfy the convergence condition, wherein steps (a)-(d) are repeated until the convergence condition is satisfied.

8. The method of embodiment 7, wherein upon determining that the convergence condition is satisfied, generating or updating the first training data based on damages scores for the images provided to the client device with which user-provided scores were received.

9. The method of any of embodiments 5-8, wherein the convergence condition comprises a difference between a damage score and a user-provided score being less than or equal to a threshold value.

10. The method of embodiment 9, wherein the threshold value is a numerical value selected from one of a following set of ranges: 0.001-0.01, 0.01-0.1, 0.1-1.0, 1-2, 1-5, 1-10.

11. The method of any of embodiments 1-10, further comprising, obtaining a first plurality of images of vehicles, each image of the first plurality of images depicting a portion of a corresponding vehicle comprising damage; obtaining a second plurality of images of the vehicles, each image of the second plurality of images depicting the portion of the corresponding vehicle absent the damage; generating second training data based on the first plurality of images and the second plurality of images; and providing the second training data to a second prediction model to train the second prediction model to estimate a damage score for a portion of a vehicle that is damaged.

12. The method of embodiment 11, further comprising: obtaining, from the second prediction model, damage scores for the first plurality of images, wherein each of the damage scores for each image of the first plurality of images, wherein the damage score indicates a likelihood that a user would purchase a corresponding vehicle depicted within the image given an amount of damage that the portion of the corresponding vehicle has.

13. The method of embodiment 12, further comprising: storing the damage scores in association with a corresponding image; and/or storing, with an image, a pointer to a location of a damage score associated with the image.

14. The method of any of embodiments 11-13, wherein the portion of the corresponding vehicle comprising damage depicted within each image of the first plurality of images comprises an exterior or an interior of the corresponding vehicle.

15. The method of any of embodiments 11-14, further comprising: generating the first damage score based on a first amount of damage associated with the first portion of the first vehicle estimated based on the second prediction model and the first image; and generating the second damage score based on a second amount of damage associated with the second portion of the second vehicle estimated based on the second prediction model and the second image.

16. The method of any of embodiments 1-15, wherein the first prediction model comprises a neural network or machine learning model.

17. The method of any of embodiments 11-16, wherein the second prediction model comprises one of a neural network or a machine learning model.

18. The method of any of embodiments 1-17, wherein the first vehicle and the second vehicle are one of an automobile, an aircraft, a watercraft, a motorcycle, a bicycle, a unicycle, a tricycle, a skateboard, roller skates, roller blades, or a scooter.

19. One or more tangible, non-transitory, machine-readable media storing instructions that, when executed by one or more processors, effectuation operations comprising those of any of embodiments 1-18.

20. A system comprising: one or more processors; and memory storing computer program instructions that, when executed by the one or more processors, cause the one or more processors to effectuate operations comprising those of any of embodiments 1-18.

21. A method, comprising: obtaining a first plurality of images of vehicles, each image of the first plurality of images depicting a portion of a vehicle comprising damage; generating training data based on the first plurality of images; providing the training data to a prediction model to estimate a damage score for each image of the first plurality of images; and obtaining a plurality of damage scores from the prediction model, wherein each of the plurality of damage scores is associated with one of the first plurality of images.

22. The method of embodiment 22, further comprising: providing the plurality of damage scores to the prediction model to train the prediction model, wherein the prediction model is configured to update one or more configurations of the prediction model based an assessment of the plurality of damage scores.

23. The method of any of embodiments 21-23, further comprising: obtaining a second plurality of images of the vehicles, each image of the second plurality of images depicting the portion of the vehicle absent the damage; and providing the second plurality of images to the prediction model.

27

24. The method of embodiment 23, wherein the second plurality of images is provided to the prediction model with the first plurality of images, such that the prediction model is configured to estimate the damage score for each image of the first plurality of images based on the first plurality of images and the second plurality of images.

25. The method of embodiment 23, wherein the second plurality of images is provided to the prediction model as reference feedback such that the assessment of the plurality of damage scores is computed based on the first plurality of images, the second plurality of images, and the plurality of damage scores.

26. The method of embodiment 25, further comprising: causing one or more configurations of the prediction model to be updated based on the assessment of the plurality of damage scores; and providing the first plurality of images to the prediction model subsequent to the one or more configurations of the prediction model being updated.

27. The method of any of embodiments 21-26, wherein the prediction model comprises a neural network or other machine learning model.

28. The method of any of embodiments 21-26, further comprising: storing the plurality of damage scores, wherein each damage score of the plurality of damage scores is stored in association with a corresponding image of the first plurality of images.

29. The method of any of embodiments 21-28, further comprising: providing a first image of at least a portion of a first vehicle having damage to a client device, wherein the first image is associated with a first damage score, the first damage score being one of the plurality of damage scores; receiving, from the client device, a first user-provided score for the first image; providing, based on the first user-provided score, a second image of at least a second portion of a second vehicle having damage to the client device, wherein the second image is associated with a second damage score, the second damage score being one of the plurality of damage scores; generating second training data based on the first damage score and the second damage score; and providing the second training data to a second prediction model to train the second prediction model to estimate a threshold score for a user.

30. The method of embodiment 29, wherein the first prediction model comprises a neural network or other machine learning model, and the second prediction model comprises a neural network or other machine learning model.

31. One or more tangible, non-transitory, machine-readable media storing instructions that, when executed by one or more processors, effectuation operations comprising those of any of embodiments 21-30.

32. A system comprising: one or more processors; and memory storing computer program instructions that, when executed by the one or more processors, cause the one or more processors to effectuate operations comprising those of any of embodiments 21-30.

What is claimed is:

1. A system for facilitating training of a neural network, the system comprising:
    a computer system comprising one or more processors programmed with computer program instructions that, when executed, cause the computer system to:
        provide a first image to a client device associated with a user, wherein the first image is randomly selected from a plurality of images of different cars that are damaged, the first image (i) depicting a first portion of a first car having a first amount of damage and (ii) being associated with a first precomputed damage score indicating a predicted likelihood that an individual would purchase a car having the first amount of damage;
        receive, from the client device, a first user-provided score for the first image indicating whether the user would purchase a car having the first amount of damage;
        responsive to determining that the first precomputed damage score and the first user-provided score do not differ by less than a threshold value, iteratively:
            (a) selecting an image of at least a portion of another car based on a user-provided score of a previously provided image, the image being associated with a pre-computed damage score;
            (b) providing the image to the client device;
            (c) receiving, from the client device, a user-provided score for the image; and
            (d) determining whether the precomputed damage score associated with the image and the user-provided score for the image differ by less than the threshold value, wherein steps (a)-(d) are repeated until a precomputed damage score of a given image and a user-provided score for the given image differ by less than the threshold value;
        select a second image from the plurality of images based on the user-provided score for the given image;
        provide the second image to the client device, wherein the second image (i) depicts a second portion of a second car having a second amount of damage and (ii) is associated with a second precomputed damage score;
        receive, from the client device, a second user-provided score for the second image indicating a likelihood that the user would purchase a car having the second amount of damage;
        in response to a determination that a difference between the second precomputed damage score and the second user-provided score is less than the threshold value, generate neural network training data based on the precomputed damage score for the given image and the second precomputed damage score such that the neural network training data comprises the precomputed damage score for the given image and the second precomputed damage score; and
        provide the neural network training data to the neural network to train the neural network to estimate a threshold score for one or more users based on the neural network training data, wherein the threshold score indicates a user tolerance of car damage when the user is determining whether to purchase the car.

2. The system of claim 1, wherein the one or more processors programmed with the computer program instructions, when executed, further cause the computer system to:
    responsive to the neural network being trained based on the neural network training data, receive a request from a new user for content comprising cars that the new user would consider purchasing;
    provide a third image to a client device associated with the new user, the third image (i) depicting a third portion of a third car having a third amount of damage and (ii) being associated with a third precomputed damage score indicating a likelihood that an individual would purchase a car having the third amount of damage;
    receive, from the client device associated with the new user, (i) an indication that the new user would purchase a car having the third amount of damage or (ii) a third user-provided score for the third image indicating the likelihood that the new user would purchase a car having the third amount of damage;

provide (i) the indication that the new user would purchase the car having the third amount of damage to the neural network or (ii) the third user-provided score to the neural network;

receive a threshold score for the new user estimated by the neural network based on (i) the indication that the new user would purchase the car having the third amount of damage or (ii) the third user-provided score to the neural network, wherein the neural network is re-trained based on updated neural network training data generated based on the neural network training data and the third user-provided score, the updated neural network training data comprising at least some of the neural network training data and the third user provided score, wherein the re-trained neural network is configured to generate the threshold score for the new user in response to the third user-provided score being provided to the neural network; and provide, to the client device associated with the new user, content associated with one or more cars, wherein the content is selected based on the threshold score for the new user and a precomputed damage score associated with each car of the one or more cars.

3. The system of claim 1, wherein the one or more processors programmed with the computer program instructions, when executed, further cause the computer system to:

obtain, prior to the first image being provided to the client device, a first plurality of images of first cars, each image of the first plurality of images depicting at least a portion of one of the first cars including damage;

obtain a second plurality of images of second cars, each image of the second plurality of images depicting at least the portion of the one of the cars excluding damage;

generate machine learning training data based on the first plurality of images of the first cars and the second plurality of images of the second cars such that the machine learning training data comprises the first plurality of images of the first cars and the second plurality of images of the second cars; and provide the machine learning training data to a machine learning model to train the machine learning model to determine a damage score for each car of the first cars based on the machine learning training data, wherein the first precomputed damage score is generated based on a first damage score associated with the first car and determined based on the machine learning model, and the second precomputed damage score is generated based on a second damage score associated with the second car and determined based on the machine learning model.

4. The system of claim 1, wherein:
the plurality of images of different cars comprise images of interiors of cars and exteriors of cars;
the first image comprises an interior of the first car including the first amount of damage;
the second image comprises an interior of the second car including the second amount of damage;
the threshold score is determined based on an interior threshold score and an exterior threshold score;
the neural network is configured to estimate the interior threshold score based on the first image and the second image;

the neural network is configured to estimate the exterior threshold score based on a third image and a fourth image;

the third image (i) depicts an exterior of a third car including a third amount of damage and (ii) is associated with a third precomputed damage score indicating a predicted likelihood that an individual would purchase a car with an exterior having the third amount of damage; and the fourth image (i) depicts an exterior of a fourth car including a fourth amount of damage, (ii) is associated with a fourth precomputed damage score indicating a predicted likelihood that an individual would purchase a car with an exterior having the fourth amount of damage, and (iii) is selected based on a third user-provided score for the third image indicating whether the user would purchase a car with an exterior having the third amount of damage.

5. A method implemented by one or more processors executing one or more computer program instructions that, when executed, perform the method, the method comprising:

providing a first image of at least a first portion of a first vehicle to a client device, wherein the first image is associated with a first damage score;

receiving, from the client device, a first user-provided score for the first image;

responsive to determining that the first damage score and the first user-provided score do not differ by less than a threshold value, iteratively:
  (a) selecting an image of at least a portion of another vehicle based on a user-provided score of a previously provided image, the image being associated with a damage score;
  (b) providing the image to the client device;
  (c) receiving a user-provided score from the client device for the image; and
  (d) determining whether the damage score associated with the image and the user-provided score for the image differ by less than the threshold value, wherein steps (a)-(d) are repeated until a damage score of a given image and a user-provided score for the given image differ by less than the threshold value;

providing, based on the user-provided score for the given image, a second image of at least a second portion of a second vehicle to the client device, wherein the second image is associated with a second damage score, and the second image is selected based on the user-provided score for the given image;

receiving, from the client device, a second user-provided score for the second image;

responsive to determining that the second damage score and the second user-provided score differ by less than the threshold value, generating first training data based on the damage score of the given image and the second damage score; and providing the first training data to a first prediction model to train the first prediction model to estimate a threshold score for a user, wherein the threshold score indicates a vehicle damage tolerance of a user when determining whether to purchase a vehicle.

6. The method of claim 5, further comprising:
receiving, subsequent to the first prediction model being trained, a request for content regarding vehicles available for purchase by a first user;

providing, for presentation to the first user, a third image of at least a third portion of a third vehicle, wherein the third image is associated with a third damage score;
receiving feedback information indicating whether the first user would purchase a vehicle having an amount of damage indicative of the third damage score;
providing the feedback information to the first prediction model; and
receiving a threshold score for the first user estimated by the first prediction model based on the feedback information.

7. The method of claim 6, further comprising:
providing, for presentation to the first user, content associated with one or more vehicles selected based on the threshold score.

8. The method of claim 6, wherein receiving the feedback information comprises:
receiving an indication that the first user would purchase the vehicle having the amount of damage indicative of the third damage score; or
receiving a third user-provided score for the third image.

9. The method of claim 5, further comprising:
providing, prior to the first image being provided to the client device, a third image of at least a third portion of a third vehicle to the client device, wherein the third image is associated with a third damage score;
receiving, from the client device, a third user-provided score for the third image; and
determining that the third damage score and the third user-provided score do not differ by less than the threshold value, wherein:
the first image is provided to the client device in response to the third damage score and the third user-provided score being determined to not differ by less than the threshold value, and
the first image is select based on the third user-provided score.

10. The method of claim 5, further comprising:
obtaining a first plurality of images of vehicles, each image of the first plurality of images depicting a portion of a corresponding vehicle comprising damage;
obtaining a second plurality of images of vehicles, each image of the second plurality of images depicting the portion of a corresponding vehicle absent the damage;
generating second training data based on the first plurality of images and the second plurality of images; and
providing the second training data to a second prediction model to train the second prediction model to estimate a damage score for a portion of a vehicle that is damaged.

11. The method of claim 10, further comprising:
generating the first damage score based on a first amount of damage associated with the first portion of the first vehicle estimated based on the second prediction model and the first image; and
generating the second damage score based on a second amount of damage associated with the second portion of the second vehicle estimated based on the second prediction model and the second image.

12. The method of claim 5, further comprising:
randomly selecting the first image from a plurality of images depicting vehicles, wherein the plurality of images comprises the second image and the given image.

13. One or more non-transitory computer readable media comprising computer program instructions that, when executed by one or more processors, effectuate operations comprising:
providing a first image of at least a first portion of a first vehicle to a client device, wherein the first image is associated with a first damage score;
receiving, from the client device, a first user-provided score for the first image;
responsive to determining that the first damage score and the first user-provided score do not differ by less than a threshold value, iteratively:
(a) selecting an image of at least a portion of another vehicle based on a user-provided score of a previously provided image, the image being associated with a damage score;
(b) providing the image to the client device;
(c) receiving a user-provided score from the client device for the image; and
(d) determining whether the damage score associated with the image and the user-provided score for the image differ by less than the threshold value, wherein steps (a)-(d) are repeated until a damage score of a given image and a user-provided score for the given image differ by less than the threshold value;
providing, based on the user-provided score for the given image, a second image of at least a second portion of a second vehicle to the client device, wherein the second image is associated with a second damage score, and the second image is selected based on the user-provided score for the given image;
receiving, from the client device, a second user-provided score for the second image;
responsive to determining that the second damage score and the second user-provided score differ by less than the threshold value, generating first training data based on the damage score for the given image and the second damage score; and
providing the first training data to a first prediction model, the first prediction model being configured based on the first training data to estimate a threshold score for a user, wherein the threshold score indicates a vehicle damage tolerance of a user when determining whether to purchase a vehicle.

14. The one or more media of claim 13, wherein the operations further comprise:
receiving, subsequent to the first prediction model being trained, a request for content regarding vehicles available for purchase by a first user;
providing, for presentation to the first user, a third image of at least a third portion of a third vehicle, wherein the third image is associated with a third damage score;
receiving feedback information indicating whether the first user would purchase a vehicle having an amount of damage indicative of the third damage score;
providing the feedback information to the first prediction model; and
receiving a threshold score for the first user estimated by the first prediction model based on the feedback information.

15. The one or more media of claim 14, wherein the operations further comprise:
providing, for presentation to the first user, content associated with one or more vehicles selected based on the threshold score.

16. The one or more media of claim 14, wherein receiving the feedback information comprises:

receiving an indication that the first user would purchase the vehicle having the amount of damage indicative of the third damage score; or receiving a third user-provided score for the third image.

17. The one or more media of claim 13, wherein the operations further comprise:

providing, prior to the first image being provided to the client device, a third image of at least a third portion of a third vehicle to the client device, wherein the third image is associated with a third damage score;

receiving, from the client device, a third user-provided score for the third image; and determining that the third damage score and the third user-provided score do not differ by less than the threshold value, wherein:

the first image is provided to the client device in response to the third damage score and the third user-provided score being determined to not differ by less than the threshold value, and the first image is select based on the third user-provided score.

18. The one or more media of claim 13, wherein the operations further comprise:

obtaining a first plurality of images of vehicles, each image of the first plurality of images depicting a portion of a corresponding vehicle comprising damage;

obtaining a second plurality of images of vehicles, each image of the second plurality of images depicting the portion of a corresponding vehicle absent the damage;

generating second training data based on the first plurality of images and the second plurality of images; and providing the second training data to a second prediction model, the second prediction model being configured based on the second training data to estimate a damage score for a portion of a vehicle that is damaged.

19. The one or more media of claim 18, wherein the operations further comprise:

generating the first damage score based on a first amount of damage associated with the first portion of the first vehicle estimated based on the second prediction model and the first image; and generating the second damage score based on a second amount of damage associated with the second portion of the second vehicle estimated based on the second prediction model and the second image.

20. The one or more media of claim 13, wherein the operations further comprise:

randomly selecting the first image from a plurality of images depicting vehicles, wherein the plurality of images comprises the second image and the given image.

* * * * *